(12) United States Patent
Shimomura et al.

(10) Patent No.: US 8,328,179 B2
(45) Date of Patent: Dec. 11, 2012

(54) TRANSPORT-OBJECT TRANSPORTING DEVICE AND IMAGE PROCESSING APPARATUS

(75) Inventors: Masaki Shimomura, Matsumoto (JP); Satoshi Negishi, Matsumoto (JP); Ryo Honma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/943,245

(22) Filed: Nov. 10, 2010

(65) Prior Publication Data

US 2011/0115146 A1    May 19, 2011

(30) Foreign Application Priority Data

Nov. 18, 2009   (JP) .................................. 2009-263205

(51) Int. Cl.
    *B65H 85/00*      (2006.01)

(52) U.S. Cl. ................... 271/4.04; 271/10.04; 271/3.18; 271/186

(58) Field of Classification Search .................. 271/186, 271/3.18, 4.04, 10.04
    See application file for complete search history.

(56) References Cited

U.S. PATENT DOCUMENTS

| | | | | | |
|---|---|---|---|---|---|
| 5,854,696 | A | * | 12/1998 | Yun | 358/498 |
| 6,073,923 | A | * | 6/2000 | Lin et al. | 271/10.03 |
| 7,136,202 | B2 | * | 11/2006 | Jang et al. | 358/474 |
| 7,355,761 | B2 | * | 4/2008 | Yang | 358/474 |
| 7,708,262 | B2 | * | 5/2010 | Boleda | 271/4.04 |
| 7,717,423 | B2 | * | 5/2010 | Litman et al. | 271/273 |
| 7,896,343 | B2 | * | 3/2011 | Iwago et al. | 271/301 |
| 7,934,717 | B2 | * | 5/2011 | Takeda et al. | 271/4.04 |
| 8,038,248 | B2 | * | 10/2011 | Uchino et al. | 347/16 |

FOREIGN PATENT DOCUMENTS

| JP | 2004-002024 | 1/2004 |
|---|---|---|
| JP | 2007-230657 | 9/2007 |

* cited by examiner

*Primary Examiner* — Kaitlin Joerger
(74) *Attorney, Agent, or Firm* — Workman Nydegger

(57) ABSTRACT

A transport-object transporting device includes a power-transmission blocking mechanism that blocks the transmission of power at an intermediate point of the cam driving gear train so as to maintain the discharge roller in the release position. The power-transmission blocking mechanism includes an engaged portion provided in the rocking arm, and an engaging portion whose engagement position thereof relative to the engaged portion is changeable by changing a rocking direction of the rocking arm. When the engaging portion is set at a predetermined engagement position relative to the engaged portion, the first planetary gear and the second planetary gear are both kept away from the cam driving gear.

5 Claims, 26 Drawing Sheets

FIG. 30

| REQUIRED CONDITIONS / STEPS | FIRST-FACE TRANSPORTATION (TOP FACE) | SECOND-FACE TRANSPORTATION (REVERSE FACE) | DRIVING MOTOR | IMAGE READING | LOCK RELEASE POSITION | RELEASE CAM |
|---|---|---|---|---|---|---|
| S1 | FEED TO TRANSPORT PATH | ENTER INVERSION PATH | CW | | | 1 |
| S2 | SKEW CORRECTION (BITE) | ↓ | ↑ | | | 1 |
| S3 | SKEW CORRECTION (DISCHARGE) | | CCW | | | 1 |
| S4 | SET DISCHARGE ROLLER IN RELEASE POSITION | | CW | | | 1 |
| S5 | FIND LEADING END OF SHEET | | CCW | | | |
| S6 | START IMAGE READING | | ↑ | 1 | | |
| S7 | LOCK RELEASE POSITION | | ↑ | 1 | 1 | |
| S8 | END OF IMAGE READING | | ↑ | 1 | 1 | |
| S9 | UNLOCK RELEASE POSITION | | ↑ | | 1 | |
| S10 | SET DISCHARGE ROLLER IN NIP POSITION | | CW | | | 1 |
| S11 | TRAILING END OF SHEET PASSES INTERMEDIATE ROLLER | | CCW | | | 1 |
| S12 | END | | ↑ | | | 0.5 |

TRANSPORT-OBJECT TRANSPORTING DEVICE AND IMAGE PROCESSING APPARATUS

BACKGROUND

1. Technical Field

The present invention relates to a transport-object transporting device that switches a rotating direction of a discharge roller between a forward direction and a reverse direction to turn over a transport object, such as a sheet, transported with its first face facing one direction by a transport roller, so as to transport the transport object with its second face facing the one direction. Specifically, the invention relates to a transport-object transporting device that can switch the discharge roller between a nip position and a release position at an optimal timing regardless of differences in lengths of transport objects in the transporting direction, and to an image processing apparatus equipped with the transport-object transporting device.

2. Related Art

As discussed in JP-A-2007-230657, image reading apparatuses, such as photocopiers, facsimile apparatuses, or scanners, equipped with auto document feeders, serving as an example of transport-object transporting devices, have already been developed. One example of an image reading apparatus of this type is an image reading apparatus that can continuously read image information recorded on both the front and back faces of a transport object (also referred to as "sheet" hereinafter). This image reading apparatus is configured to guide a sheet fed with its first face facing upward to a semi-loop-shaped transport path provided with a transport roller, an image reader, and a discharge roller, so as to transport the sheet with its first face facing downward and read an image from the first face. This operation of transporting a sheet with its first face as the subject face will be referred to as "first-face transportation" hereinafter.

Subsequently, the image reading apparatus switches the transporting direction so as to make the sheet enter an inversion path and guide the sheet again to the transport path. Thus, the image reading apparatus transports the sheet with its second face, opposite the first face, facing downward and reads an image from the second face. This operation of transporting a sheet with its second face as the subject face will be referred to as "second-face transportation" hereinafter.

The switching of the transporting direction of the sheet required when continuously reading the images from the first face and the second face of the sheet and the switching between the nip position and the release position of the discharge roller are performed at preset operation timings by a transport-object transporting device (also referred to as "sheet transporting device" hereinafter).

Sheet transporting devices of the aforementioned type are becoming smaller in size with size reduction of image reading apparatuses, resulting in shorter transport paths. Therefore, when transporting a sheet that is long in the transporting direction, apart of the sheet sent to the inversion path and another part of the sheet discharged outward from the transport path rub against each other at the nip point of the discharge roller during second-face transportation. For this reason, the discharge roller is set in the release position at a timing at which the rubbing occurs, thereby allowing for such rubbing.

However, when the switching of the transporting direction of the sheet and the switching between the nip position and the release position of the discharge roller are performed by using a single driving motor, the aforementioned operation timings therefor are fixed timings determined on the basis of a reduction ratio or the like of a gear train. For this reason, the length of sheets in the transporting direction that allows for continuous operation of first-face transportation and second-face transportation is limited to a certain range (between, for example, the longitudinal dimension of a letter-size sheet and the longitudinal dimension of an A4-size sheet). Therefore, in view of the problem related to the rubbing mentioned above, sheets with a length in a wide range of, for example, the lateral dimension of an A4-size sheet to a 17-inch-size sheet (i.e., 210 mm to 432 mm) cannot be handled in the sheet transporting device of the related art.

The switching between the nip position and the release position of the discharge roller can be performed using additional power that is independent of the power from the transport roller or the discharge roller by utilizing, for example, a solenoid disclosed in JP-A-2004-2024. However, this can lead to an increased number of components and to a complicated structure, resulting in an increase in the cost of the sheet transporting device.

SUMMARY

An advantage of some aspects of the invention is that a transport-object transporting device that transports a transport object by switching a discharge roller between a nip position and a release position is provided, in which various kinds of transport objects with a wide range of lengths in the transporting direction can be handled.

A transport-object transporting device according to a first aspect of the invention includes a forwardly and reversely rotatable driving motor; a transport roller that rotates in a forward direction so as to transport a transport object on a transport path; a discharge roller that rotates in the forward direction so as to discharge the transport object from the transport path and that rotates in a reverse direction so as to send the transport object to the transport roller via an inversion path, the discharge roller capable of being set in a nip position and a release position; a nip-release switching mechanism that switches the discharge roller between the nip position and the release position in accordance with a rotational position of a cam driving gear; a cam driving gear train that transmits rotation of the driving motor to the cam driving gear, the cam driving gear train having a first planetary gear that transmits power to the cam driving gear by rotating a rocking arm in a predetermined direction when the driving motor rotates in a first direction, and a second planetary gear that transmits power to the cam driving gear via an intermediate gear by rotating the rocking arm in a direction opposite the predetermined direction when the driving motor rotates in a second direction; and a power-transmission blocking mechanism that blocks the transmission of power at an intermediate point of the cam driving gear train so as to maintain the discharge roller in the release position. The power-transmission blocking mechanism includes an engaged portion provided in the rocking arm, and an engaging portion whose engagement position thereof relative to the engaged portion is changeable by changing a rocking direction of the rocking arm. When the engaging portion is set at a predetermined engagement position relative to the engaged portion, the first planetary gear and the second planetary gear are both kept away from the cam driving gear.

According to this aspect, the cam driving gear train is provided with a cam driving planetary-gear mechanism that produces a dual-system power transmission state of the first planetary gear side and the second planetary gear side, and the power-transmission blocking mechanism that operates in conjunction with the movement of the rocking arm of the cam driving planetary-gear mechanism. When the engaging portion of the power-transmission blocking mechanism is set at the predetermined engagement position relative to the engaged portion, the first planetary gear and the second planetary gear are both kept away from the cam driving gear. This allows for switching between the aforementioned dual-system power transmission state and a non power transmission state achieved by another system at an appropriate timing.

Therefore, the power-transmission blocking mechanism can maintain the discharge roller in the release position for a desired period of time, thereby allowing for handling of transport objects of various lengths in the transporting direction, as well as allowing parts of a transport object to rub against each other at the nip point of the discharge roller.

The power-transmission blocking mechanism is constituted of the engaged portion provided in the rocking arm and the engaging portion that engages with the engaged portion, and obtains power from the rocking arm. Therefore, the transport-object transporting device can be achieved by a small number of components and a simplified structure.

In the transport-object transporting device according to the first aspect, it is preferable that an intermediate roller that applies a transporting force to the transport object be disposed at a position in the transport path located downstream from the transport roller and in front of the discharge roller.

Accordingly, this can reduce an adverse effect of a mismatch between the number of steps of the driving motor and the actual transported amount of the transport object caused by the switching of the driving motor between the forward and reverse directions when power is transmitted to the cam driving gear again as a result of the engaging portion of the power-transmission blocking mechanism moving out of the predetermined engagement position (also referred to as "cam-drive stop position" hereinafter).

In the transport-object transporting device according to the first aspect, it is preferable that the engaging portion be moved in a certain direction around the engaged portion along a movement path by changing the rocking direction of the rocking arm, the movement path being formed around the engaged portion or in the engaged portion.

Accordingly, since the engaging portion can be made to move in an orderly manner in association with the rocking of the rocking arm, the switching between a state where the transmission of power to the cam driving gear is blocked (stopped) by the power-transmission blocking mechanism and a state where power is transmitted again to the cam driving gear can be performed at a more accurate timing.

In the transport-object transporting device according to the first aspect, it is preferable that the engaged portion include a first engagement projection and a second engagement projection that are provided in an extension segment extending from the rocking arm. In this case, a guide path that guides the engaging portion to the predetermined engagement position and a hook portion that engages with the engaging portion having reached the predetermined engagement position so as to stop the rocking arm from rocking are preferably provided between the first engagement projection and the second engagement projection.

Accordingly, the engaged portion is constituted of the first engagement projection and the second engagement projection. Therefore, the structure of the engaged portion can be simplified. Moreover, by disposing the first engagement projection and the second engagement projection with a distance therebetween and providing the guide path therebetween, the inner and outer wall surfaces of the first engagement projection and the second engagement projection can be used as guide surfaces, thereby forming the movement path for the engaging portion. Furthermore, since the engaging portion comes into engagement with the hook portion provided in the guide path, the rocking of the rocking arm is stopped at an intermediate point. Therefore, a non power transmission state in which the first planetary gear and the second planetary gear are not meshed with each other is produced, and this state can be reliably maintained.

In the transport-object transporting device according to the first aspect, it is preferable that the engaging portion be movable in accordance with a change in a rocking position of the rocking arm and receive a bias force that tries to set the engaging portion at a predetermined neutral position.

Accordingly, the engaging portion can move in correspondence with a change in the orientation and the position of the engaged portion occurring in response to a change in the rocking position of the rocking arm. Due to the bias force constantly applied to the engaging portion, the engaging portion is biased toward the predetermined neutral position. Therefore, when the engaging portion is not in abutment with the engaged portion, the engaging portion is set at the neutral position. Consequently, the timing and the position at which the engaging portion starts to come into engagement with the engaged portion are always the same, thereby stabilizing the movement path and the cam-drive stop position of the engaging portion.

It is preferable that the transport-object transporting device according to the first aspect further include a feed roller that rotates in the forward direction so as to feed the transport object set on a feed tray; a transport-roller driving gear train having a transport planetary-gear mechanism that transmits the rotation of the driving motor to the transport roller; a discharge-roller driving gear train having a discharge planetary-gear mechanism that transmits the rotation of the driving motor to the discharge roller; and a feed-roller driving gear train that transmits the rotation of the driving motor to the feed roller via the discharge planetary-gear mechanism. In this case, an arm locking mechanism is preferably provided at a position downstream of the transport roller, the arm locking mechanism locking the movement of the rocking arm of the transport planetary-gear mechanism and unlocking the rocking arm in response to passing of the transport object.

Accordingly, multiple kinds of operation, including the feeding, the transporting, and the discharging of the transport object as well as the operation of the nip-release switching mechanism, the power-transmission blocking mechanism, and the arm locking mechanism, can be performed continuously at predetermined timings using a single driving motor. Therefore, the efficient use of the single driving motor allows for reduction in the cost of components as well as reduction in the manufacturing cost.

Furthermore, the use of the arm locking mechanism allows for reverse rotation of the transport roller so that skew correction can be performed on the transport object, thereby allowing for smooth transportation of the transport object.

An image processing apparatus according to a second aspect of the invention includes an image processor provided at a position between a transport roller and a discharge roller in a transport path and configured to continuously perform image processing on opposite faces of a transport object transported by the transport roller; and a transport-object transporting device that switches a transporting direction of the transport object after the image processing is performed on a first face of the transport object so as to make the transport object enter an inversion path where the transport object is subsequently turned over so that a second face opposite the first face of the transport object faces the image processor. In this case, the transport-object transporting device is the transport-object transporting device according to the first aspect.

According to this aspect, with the same effects and the same advantages of those in the first aspect, first-face transportation and second-face transportation can be smoothly performed without being affected by differences in the lengths of transport objects in the transporting direction. Therefore, the image processing performed on both faces of the transport object can be performed with high accuracy without being affected by the differences in the lengths of transport objects in the transporting direction.

BRIEF DESCRIPTION OF THE DRAWINGS

The invention will be described with reference to the accompanying drawings, wherein like numbers reference like elements.

FIG. 30 illustrates a basic flow of operation performed by the sheet transporting device according to the second embodiment of the invention.

DESCRIPTION OF EXEMPLARY EMBODIMENTS

Figure 1:
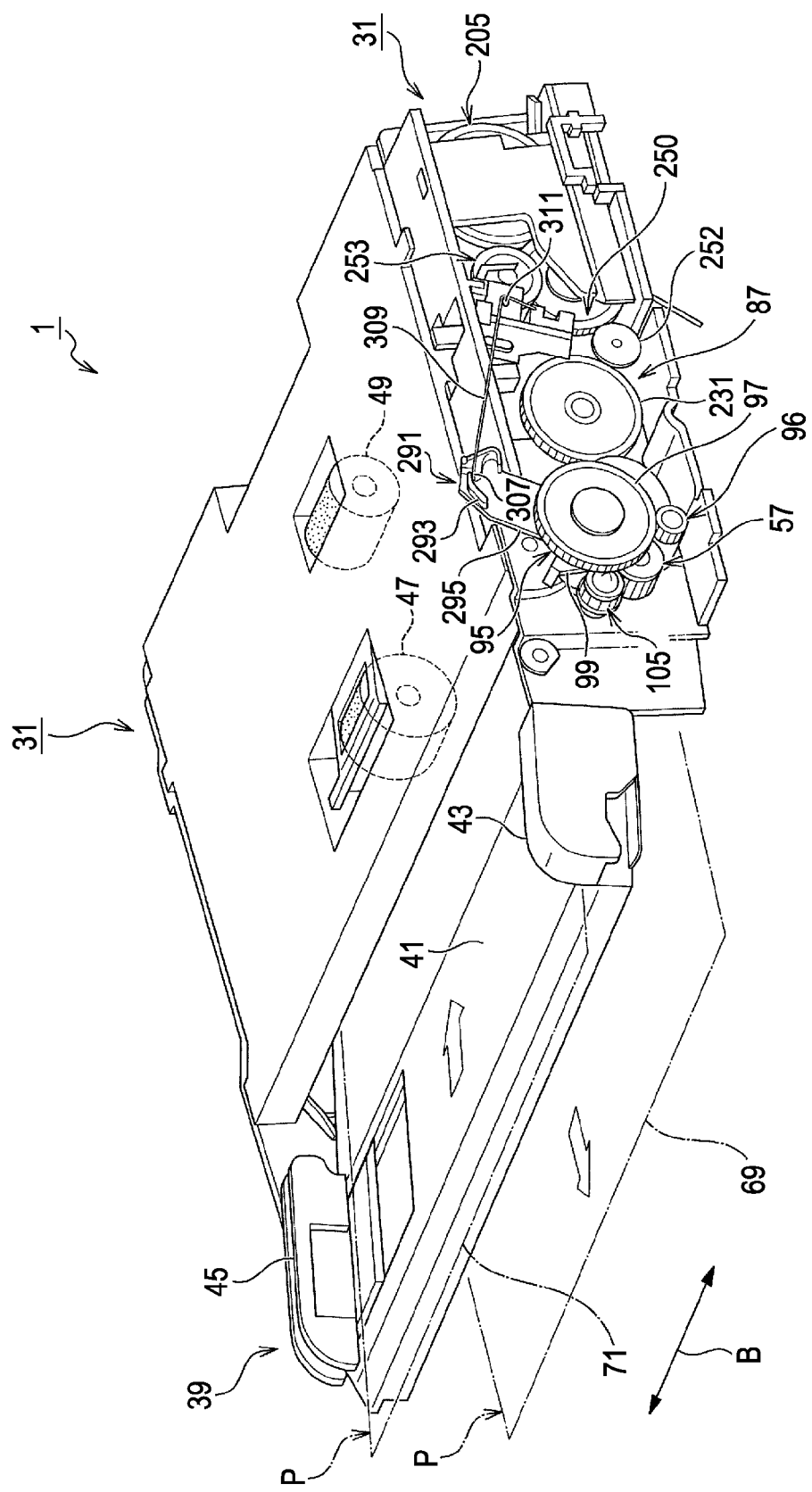
FIG. 1 is an external perspective view showing a sheet transporting device according to an embodiment of the invention.

Embodiments of a transport-object transporting device and an image processing apparatus according to the invention will be described in detail below with reference to the drawings. First, with reference to a scanner 1 according to an embodiment acting as the image processing apparatus equipped with the transport-object transporting device according to the invention, the schematic internal structure of the scanner 1 will be described below.

The scanner 1 shown in the drawings is an image reading apparatus that can continuously read images recorded on both a first face 3 and a second face 5, opposite the first face 3, of a transport object (also referred to as "sheet" hereinafter) P serving as an original.

Figure 2:
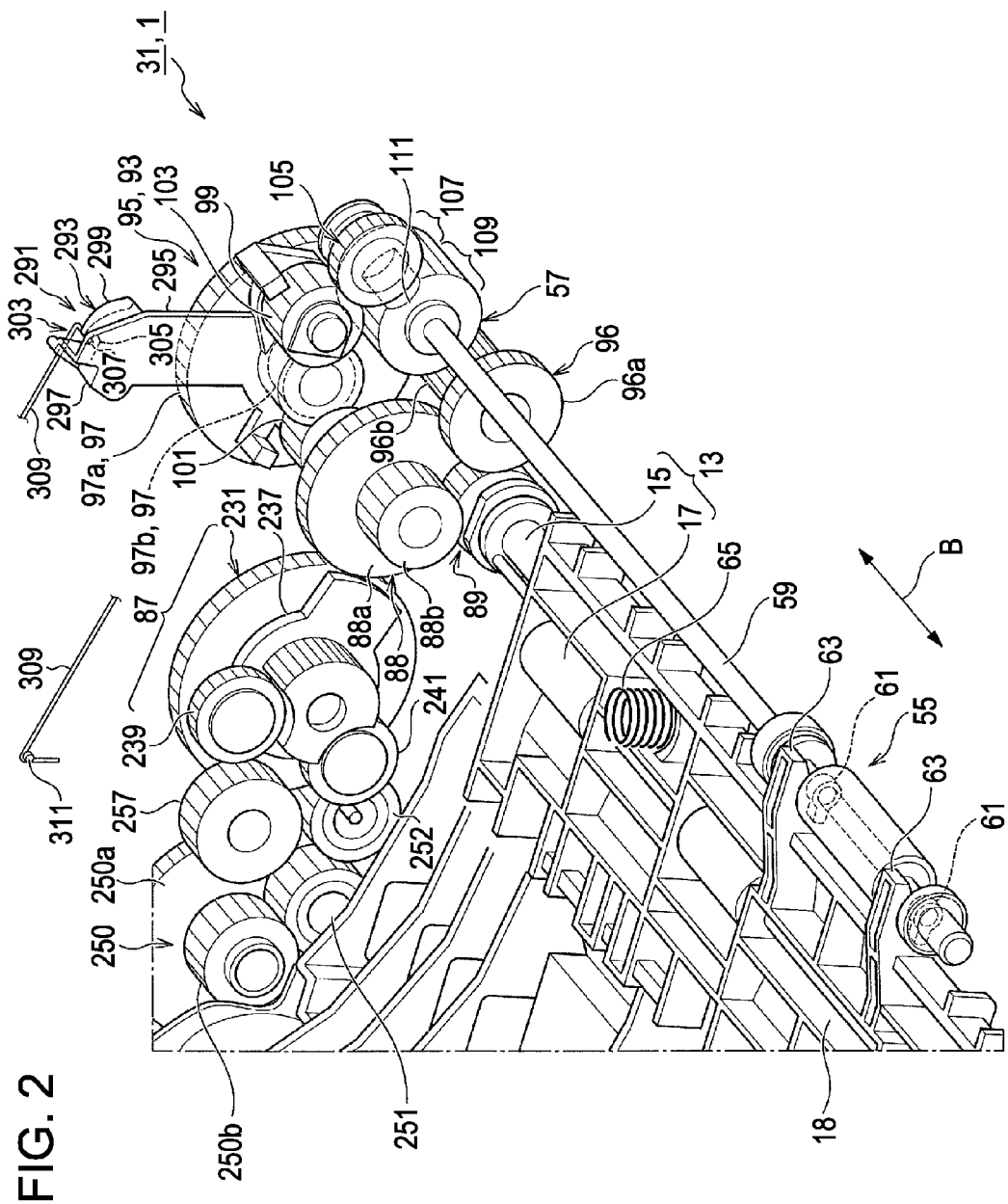
FIG. 2 is a perspective view showing a nip-release switching mechanism, a cam driving gear train, a discharge-roller driving gear train, and a power-transmission blocking mechanism of the sheet transporting device according to the embodiment of the invention.
Figure 3:
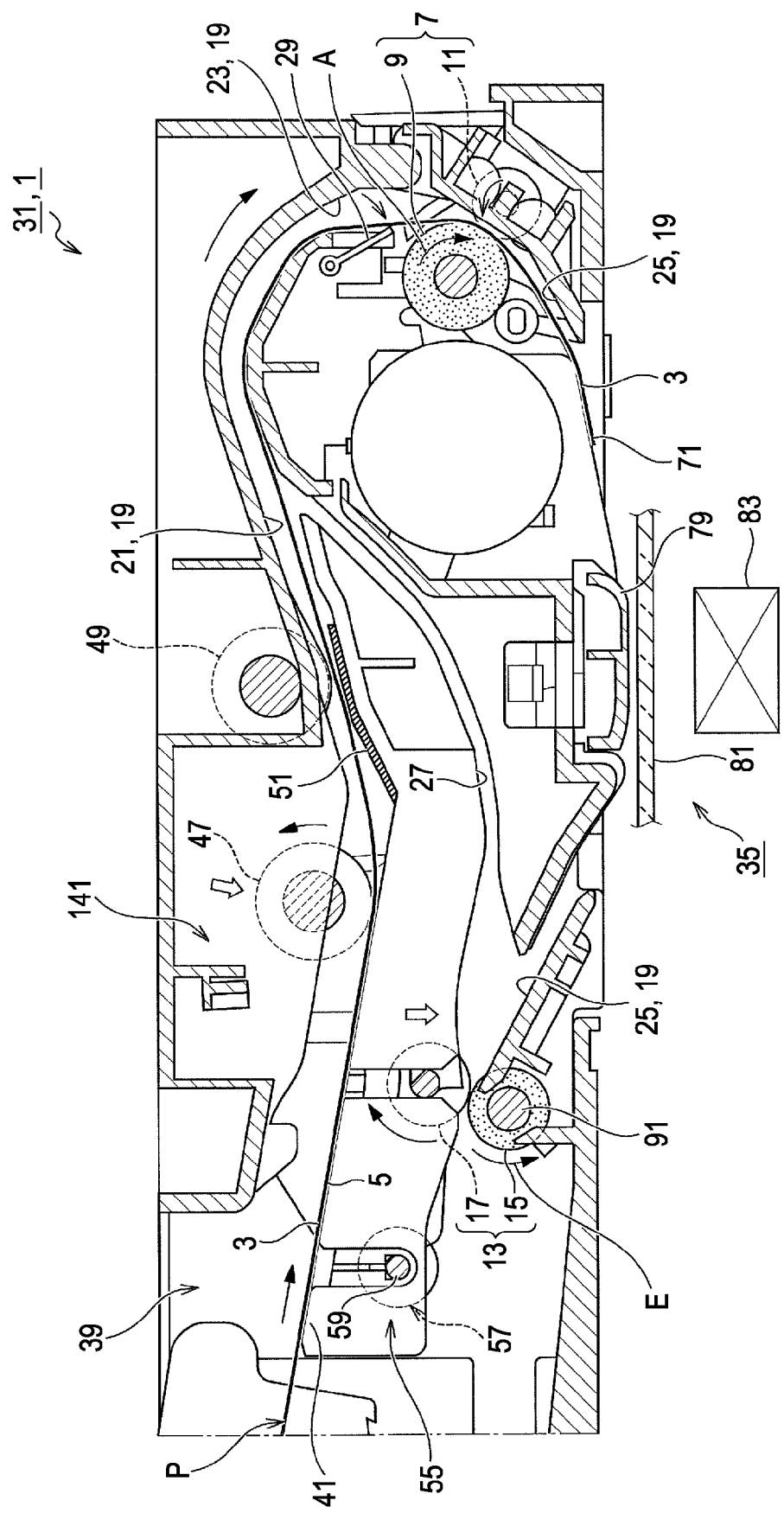
FIG. 3 is a cross-sectional view showing an internal structure of the sheet transporting device according to the embodiment of the invention during first-face transportation.

Specifically, as shown in FIGS. 1, 2, and 3, the scanner 1 includes a transport-object transporting device (referred to as "sheet transporting device" hereinafter) 31 and an image processor 35. The sheet transporting device 31 performs first-face transportation by guiding the sheet P fed with its first face 3 facing upward to a semi-loop-shaped transport path 19 provided with a transport roller 7 and a discharge roller 13 so as to make the first face 3 face downward, and subsequently performs second-face transportation by switching the transporting direction so as to make the sheet P enter an inversion path 27 and guide the sheet P to the transport path 19 again, thereby making the second face 5 face downward. The image processor 35 is provided between the transport roller 7 and the discharge roller 13 in the transport path 19 and continuously performs image processing on the first face 3 and the second face 5 transported by the transport roller 7.

The transport path 19 is formed of a path member in which a first transport portion 21, a turning portion 23, and a second transport portion 25 are arranged in a semi-loop-like shape. On the upstream side of the first transport portion 21 is disposed a feed tray 39 that includes a base 41 for setting the sheet P thereon, and a fixed edge-guide 43 and a movable edge-guide 45 for adjusting and positioning the left and right edges of the set sheet P.

Furthermore, a feed portion extending from above an end of the feed tray 39 to the first transport portion 21 in the transport path 19 is provided with a feed roller 47 that sequentially feeds an uppermost sheet P from a plurality of sheets P stacked on the feed tray 39, and a separation roller 49 and a separation pad 51 that separate an uppermost sheet P from multiple sheets P, in the case of multiple sheet feed, and then feed the uppermost sheet P toward the transport path 19.

The first transport portion 21 is where the aforementioned sheet P fed from the feed tray 39 is first received. In the first transport portion 21, the sheet P is transported with its first face 3 facing upward. The turn portion 23 is where the sheet P transported from the first transport portion 21 is turned over and passed over to the second transport portion 25. The aforementioned transport roller 7 constituted of a pair of nip rollers, i.e., a transport driving roller 9 and a transport driven roller 11, is disposed at the downstream side of the turn portion 23.

The second transport portion 25 receives the aforementioned sheet P turned over by the turn portion 23, transports the sheet P toward the image processor 35, and then transports the sheet P further toward the aforementioned discharge roller 13 constituted of a pair of nip rollers, i.e., a discharge driving roller 15 and a discharge driven roller 17, disposed at the downstream end of the second transport portion 25. The second transport portion 25 is configured to transport the sheet P with its first face 3 facing downward during first-face transportation, and to transport the sheet P with its second face 5 facing downward during second-face transportation.

The discharge roller 13 can be switched between a nip position and a release position by a nip-release switching mechanism 55, to be described later, so that a leading end 69 and a trailing end 71 of the sheet P can rub against each other at the nip point of the discharge roller 13 if the sheet P has a great length in the transporting direction.

The term "length in the transporting direction" refers to an effective length of a sheet P that can vary depending on the orientation of the sheet P actually being transported. For example, an A4-size sheet P transported in a longitudinally oriented state has a length of 297 mm in the transporting direction, whereas the A4-size sheet P transported in a laterally oriented state has a length of 210 mm in the transporting direction.

In this embodiment, a maximum length in the transporting direction is set at 432 mm as an example so that an A3-size sheet can be transported in a longitudinally oriented state.

Figure 4:
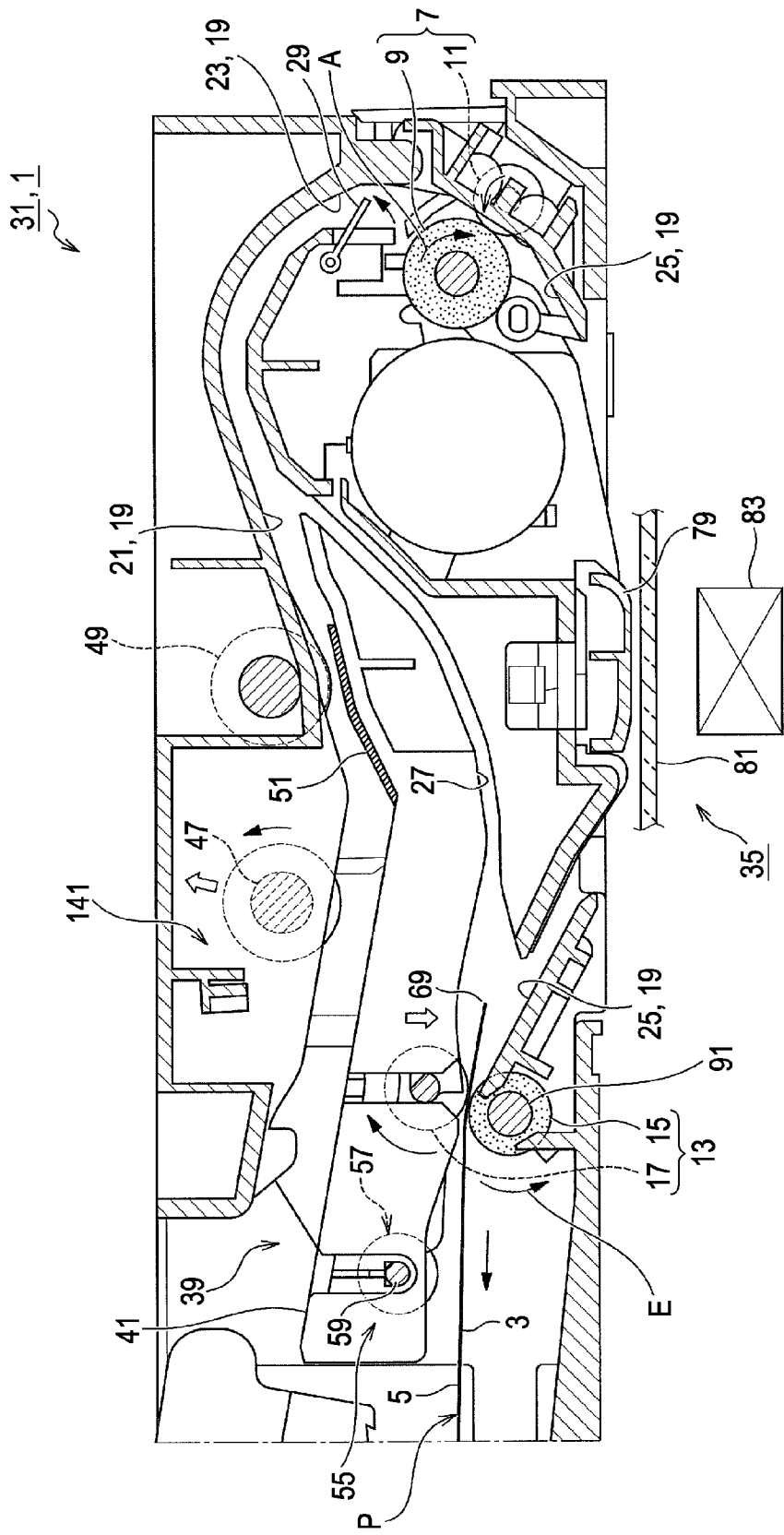
FIG. 4 is a cross-sectional view showing the internal structure of the sheet transporting device according to the embodiment of the invention when the first-face transportation is completed.
Figure 5:
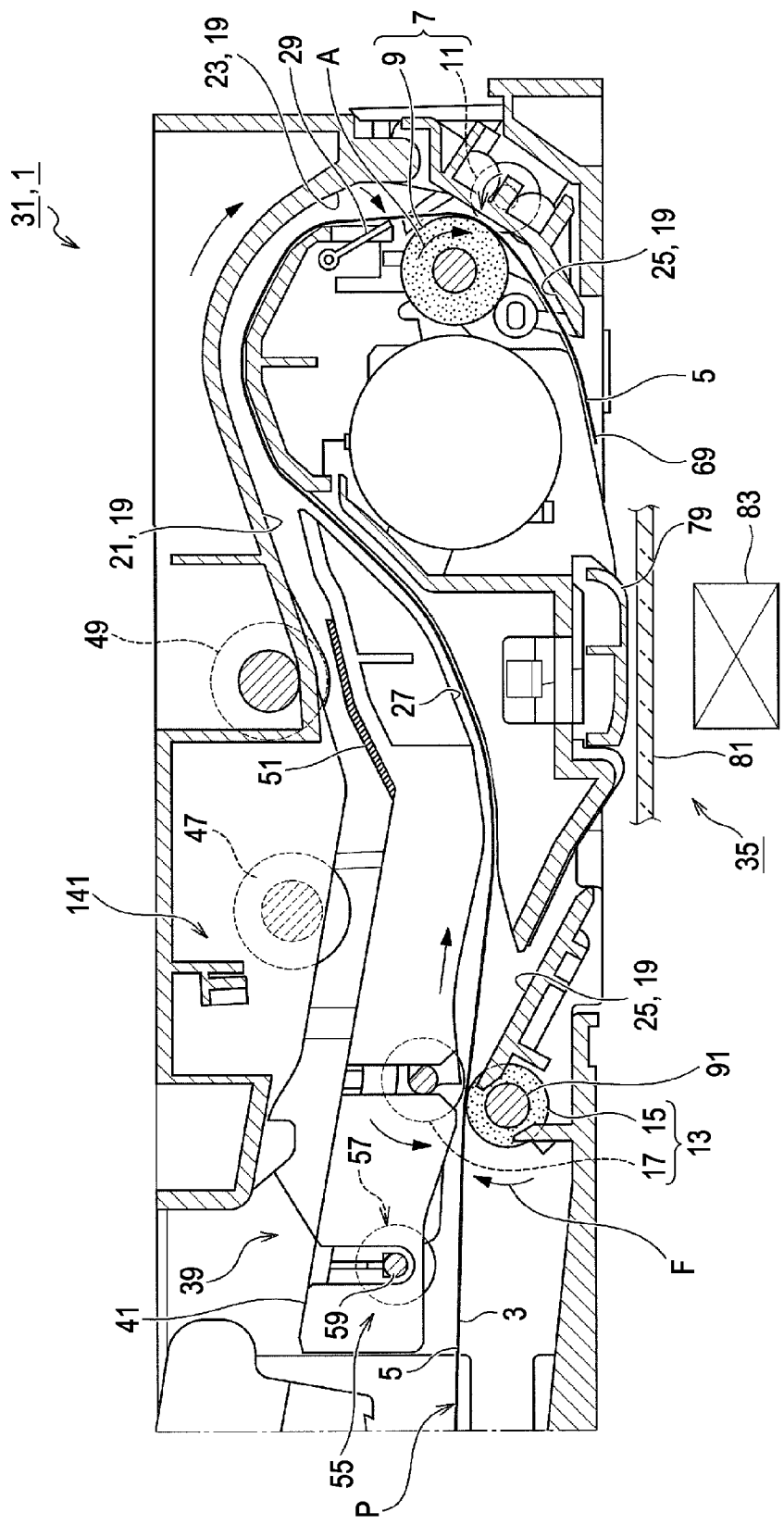
FIG. 5 is a cross-sectional view showing the internal structure of the sheet transporting device according to the embodiment of the invention during a first half of second-face transportation.

As shown in FIGS. 4 and 5, the inversion path 27 is used for performing second-face transportation by re-guiding the sheet P having undergone first-face transportation to the upstream part of the turn portion 23 in the transport path 19 so as to turn over the sheet P.

An upstream position near the transport roller 7 is provided with, for example, a detection sensor 29 that detects the passing of the sheet P transported along the transport path 19.

The image processor 35 includes a transport-object supporter (referred to as "sheet supporter" hereinafter) 79 that is disposed above the transported sheet P and that supports the sheet P in a state of tension by pressing the sheet P from above, a glass plate 81 disposed below the transported sheet P, and an image reader 83 having a fluorescent lamp and a photoreceptive sensor provided within a housing defined by the glass plate 81.

First Embodiment

FIGS. 1 to 28

The scanner 1 is capable of loading therein a sheet transporting device 31 according to an embodiment to be described below. The sheet transporting device 31 includes a driving motor 201 capable of rotating in forward and reverse directions, a feed roller 47 that rotates in a feeding direction G so as to feed sheets P set on the feed tray 39 in a one-by-one fashion, a transport roller 7 that rotates in a transporting direction A so as to transport the sheet P on the transport path 19, a discharge roller 13 switchable between a nip position and a release position and configured to rotate in a discharging direction E to discharge the sheet P from the transport path 19 or rotate in an entry direction F to send the sheet P to the transport roller 7 via the inversion path 27, and a nip-release switching mechanism 55 that switches the discharge roller 13 between the nip position and the release position in accordance with a rotational position of a cam driving gear 57.

Figure 8:
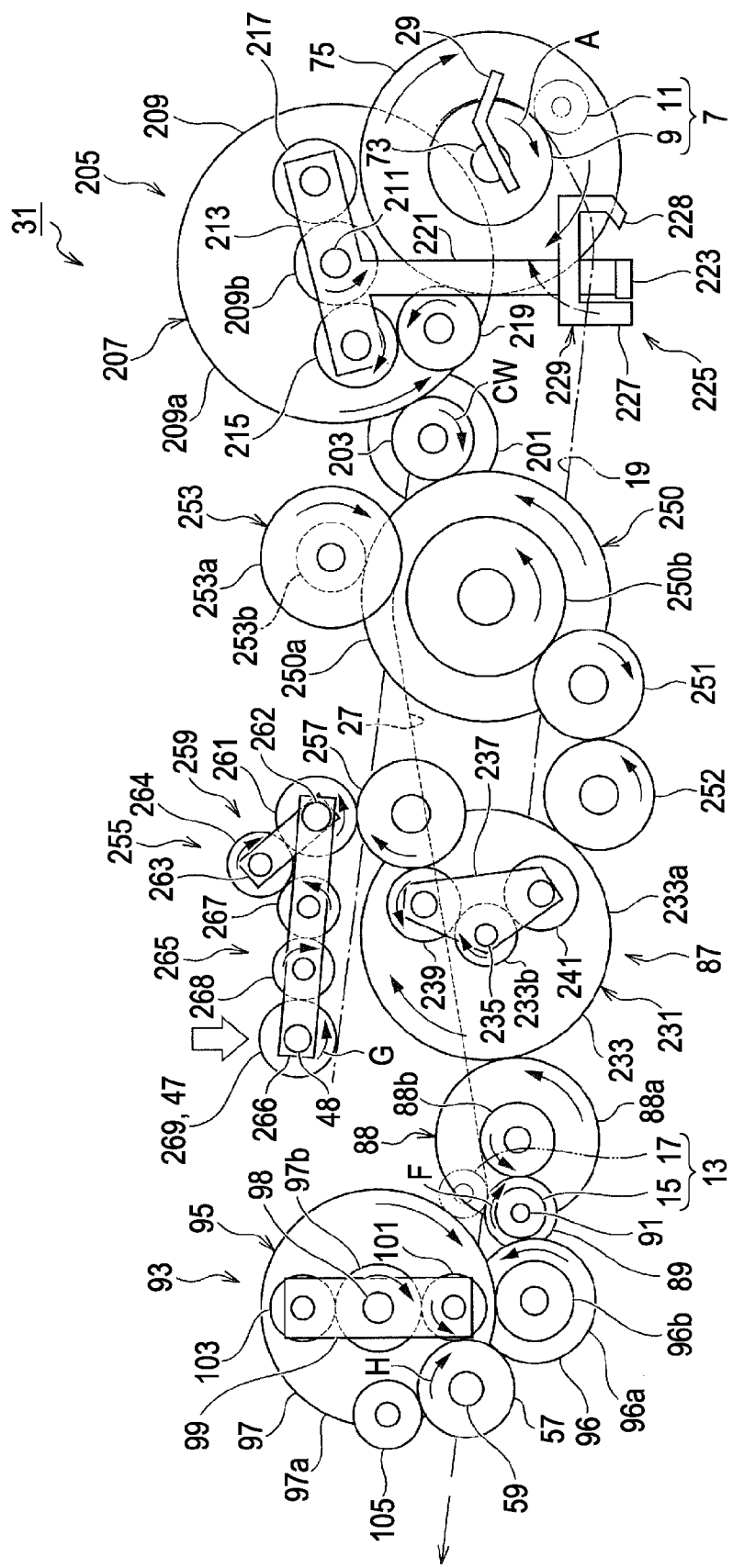
FIG. 8 is a side view showing the schematic structure of driving gear trains of the sheet transporting device according to the embodiment of the invention when a driving motor rotates in the reverse direction.
Figure 9:
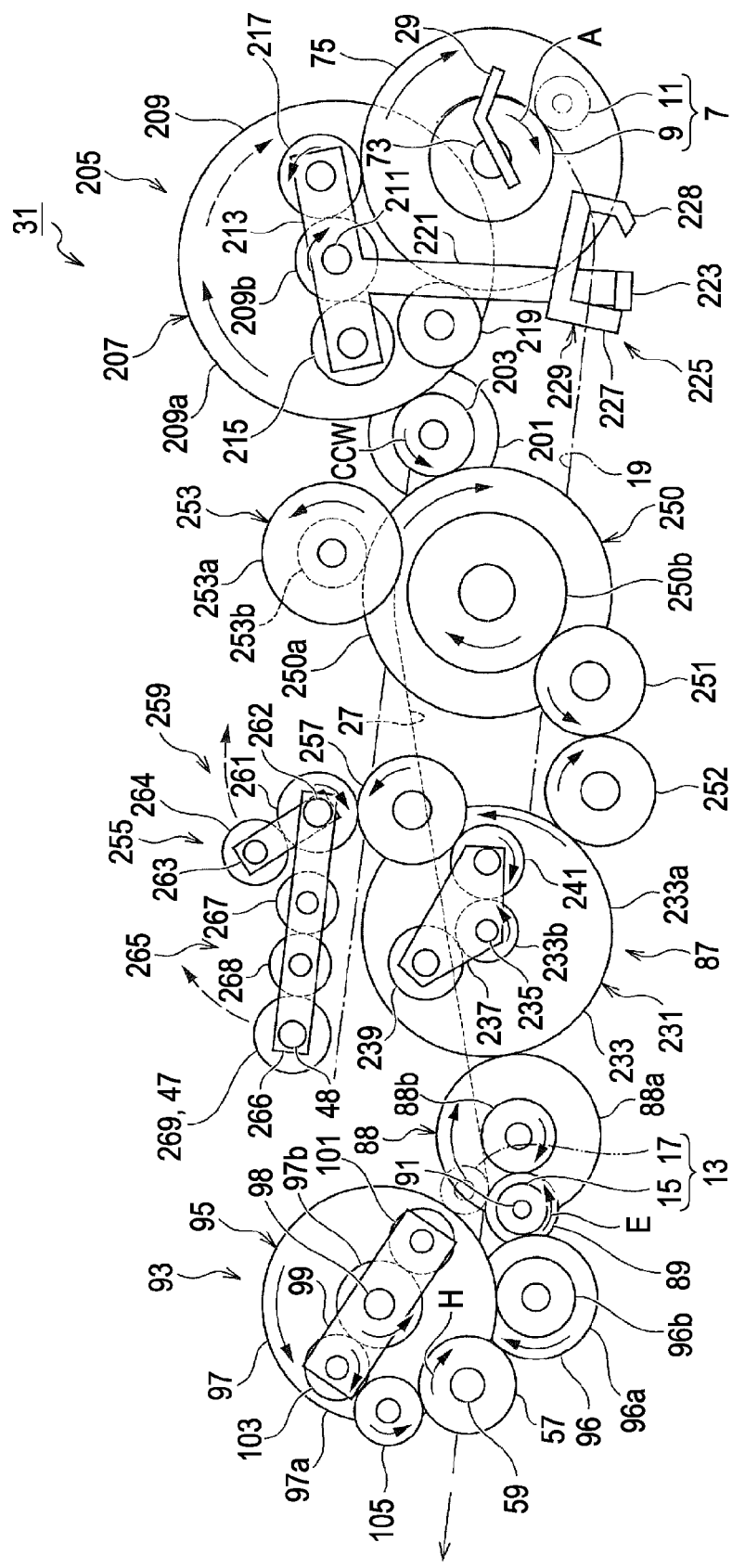
FIG. 9 is a side view showing the schematic structure of the driving gear trains of the sheet transporting device according to the embodiment of the invention when the driving motor rotates in the forward direction.

Furthermore, as shown in FIGS. 8 and 9, the sheet transporting device 31 is provided with a transport-roller driving gear train 205 having a transport planetary-gear mechanism 207 that transmits the rotation of a pinion gear 203 of the driving motor 201 to the transport roller 7, a discharge-roller driving gear train 87 having a discharge planetary-gear mechanism 231 that transmits the rotation of the pinion gear 203 of the driving motor 201 to the discharge roller 13, a feed-roller driving gear train 255 that transmits the rotation of the pinion gear 203 of the driving motor 201 to the feed roller 47 via the discharge planetary-gear mechanism 231, and a cam driving gear train 93 having a cam driving planetary-gear mechanism 95 that transmits the rotation of a discharge-roller driving gear 89 attached to a discharge-roller driving shaft 91 provided with the discharge driving roller 15 to the cam driving gear 57.

Furthermore, the sheet transporting device 31 is provided with an arm locking mechanism 225 that temporarily locks the movement of a rocking arm 213 of the transport planetary-gear mechanism 207 to perform skew correction on the sheet P and then releases the locked state in response to passing of the sheet P, and a power-transmission blocking mechanism 291 configured to block the transmission of power at an intermediate point of the cam driving gear train 93, which is to receive rotation from the driving motor 201 serving as a driving source, so as to maintain the discharge roller 13 in the release position.

Structure and Power Transmission of Sheet Transporting Device

The sheet transporting device 31 according to this embodiment utilizes the rotation of the single forwardly- and reversely rotatable driving motor 201 so as to make the aforementioned four kinds of driving gear trains 205, 87, 255, and 93 operate in conjunction with each other, thereby driving the transport roller 7, the discharge roller 13, and the feed roller 47 and operating the nip-release switching mechanism 55, the arm locking mechanism 225, and the power-transmission blocking mechanism 291.

First, the schematic structures of the driving gear trains 205, 87, 255, and 93, the transmission of power when the driving motor 201 rotates in a reverse direction CW, and the transmission of power when the driving motor 201 rotates in a forward direction CCW will be described with reference to FIGS. 8 and 9.

1. Structure and Power Transmission of Transport-Roller Driving Gear Train

The transport-roller driving gear train 205 is configured to transmit the rotation of the pinion gear 203 of the driving motor 201 to a transport-roller driving gear 75 attached to a transport-roller driving shaft 73 provided with the transport driving roller 9 via the transport planetary-gear mechanism 207 and an intermediate gear 219.

The transport planetary-gear mechanism 207 includes a sun gear 209 having a large-diameter gear portion 209a meshed with the pinion gear 203 of the driving motor 201 and a small-diameter gear portion 209b formed integrally with the large-diameter gear portion 209a, the rocking arm. 213 that rocks about a rotation shaft 211 of the sun gear 209, a first planetary gear 215 supported by a first end of the rocking arm 213, and a second planetary gear 217 supported by a second end of the rocking arm 213.

The first planetary gear 215 and the second planetary gear 217 are configured to mesh with the small-diameter gear portion 209b of the aforementioned sun gear 209 with the small-diameter gear portion 209b interposed therebetween.

As shown in FIG. 8, when the pinion gear 203 of the driving motor 201 rotates in the reverse direction CW, power is transmitted to the sun gear 209, the first planetary gear 215, the intermediate gear 219, and the transport-roller driving gear 75 in that order, as shown with arrows in FIG. 8, thereby rotating the transport driving roller 9 in the transporting direction A.

On the other hand, as shown in FIG. 9, when the pinion gear 203 of the driving motor 201 rotates in the forward direction CCW, power is transmitted to the sun gear 209, the second planetary gear 217, and the transport-roller driving gear 75 in that order, as shown with arrows in FIG. 9, thereby rotating the transport driving roller 9 in the same transporting direction A.

Therefore, when in a normal mode, the transport-roller driving gear train 205 is configured such that the transport driving roller 9 always rotates in the transporting direction A whether the rotating direction of the driving motor 201 is switched to the forward direction CCW or the reverse direction CW.

However, the rotation of the transport driving roller 9 is temporarily reversed in a returning direction D immediately after the leading end 69 of the sheet P passes the transport roller 7, thereby performing skew correction. This screw correction is performed by moving the sheet P in the returning direction D so as to remove skew occurring in the sheet P being transported.

2. Structure of Arm Locking Mechanism

Figure 10:
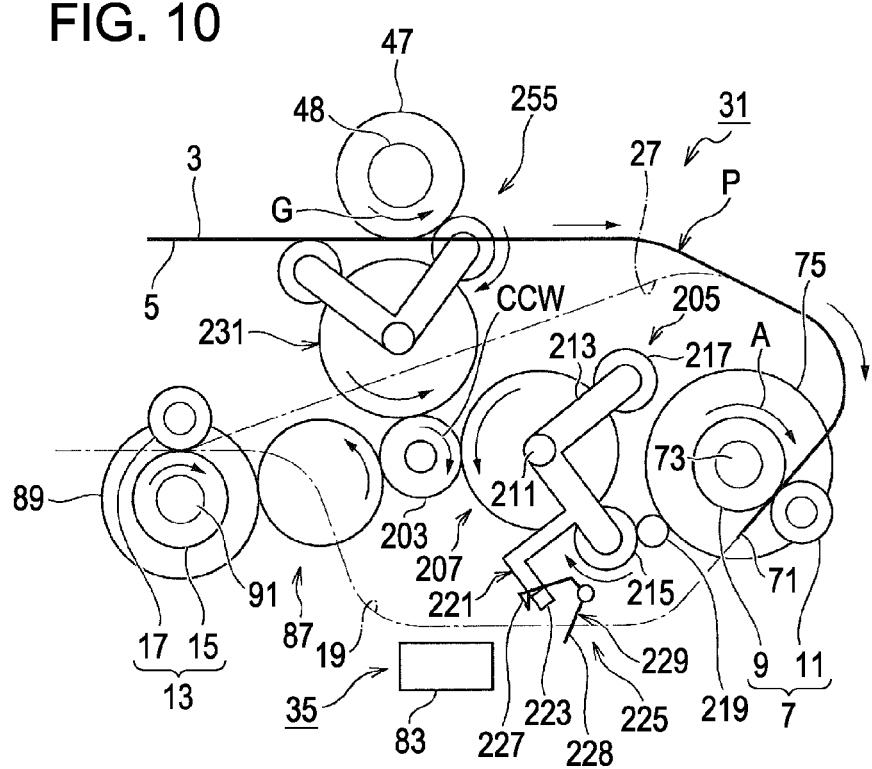
FIG. 10 is a side view showing the operation principle of an arm locking mechanism of the sheet transporting device according to the embodiment of the invention and the flow of sheet transportation when the first-face transportation is commenced.
Figure 11:
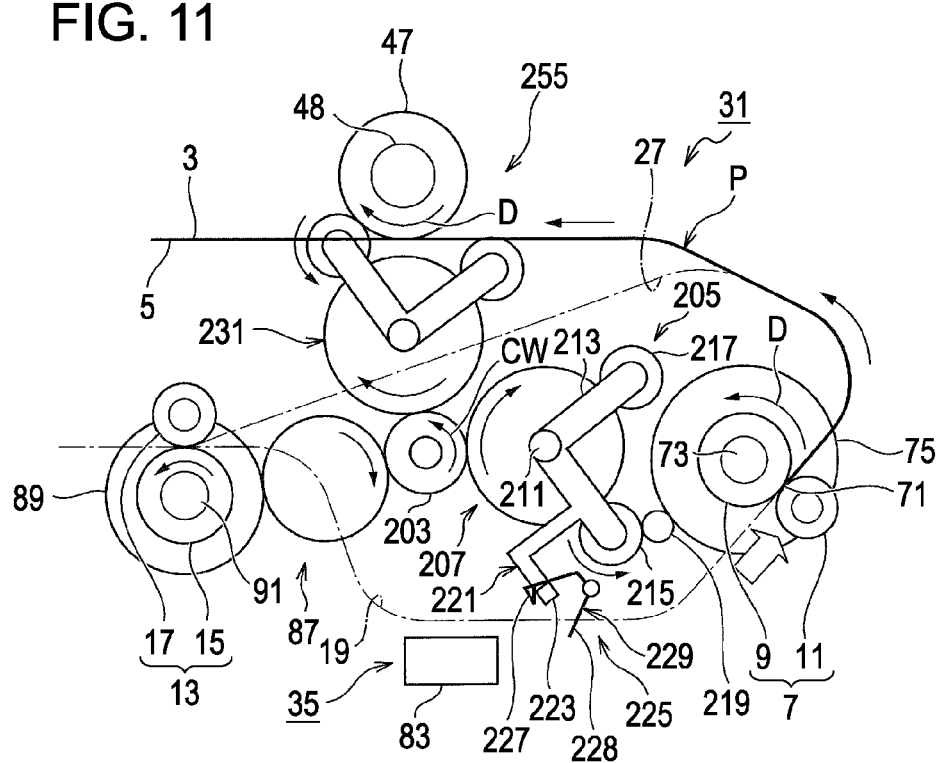
FIG. 11 is a side view showing the operation principle of the arm locking mechanism of the sheet transporting device according to the embodiment of the invention and the flow of sheet transportation when skew correction is performed.
Figure 12:
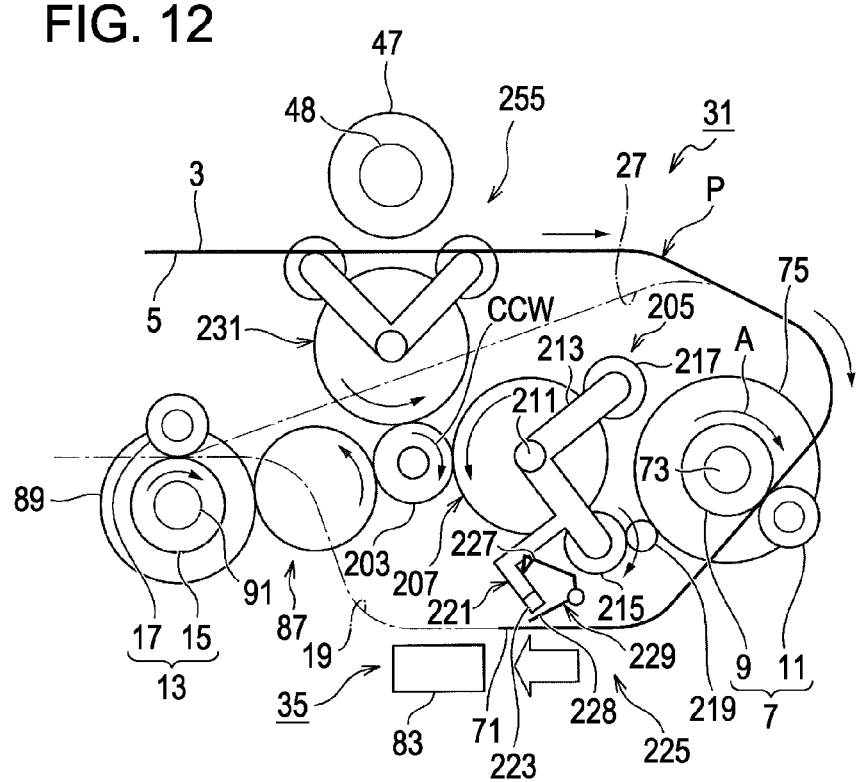
FIG. 12 is a side view showing the operation principle of the arm locking mechanism of the sheet transporting device according to the embodiment of the invention and the flow of sheet transportation when the first-face transportation is resumed.

Specifically, as shown in FIGS. 10 and 11, the arm locking mechanism 225 temporarily locks the movement of the rocking arm 213 of the transport planetary-gear mechanism 207 at a position where the first planetary gear 215 is meshed with the transport-roller driving gear 75 via the intermediate gear 219, thereby allowing for rotation of the transport driving roller 9 in the returning direction D.

The arm locking mechanism 225 includes an extension arm 221 extending from the rocking arm 213 of the transport planetary-gear mechanism 207 and having a latching portion 223 at an end thereof, and a rockable locking arm 229 whose first end is provided with a locking segment 227 that engages with the latching portion 223 so as to stop the rocking of the extension arm 221 and whose second end is provided with an unlocking lever 228 that comes into contact with the sheet P transported on the transport path 19 so as to release the locked state of the extension arm 221 achieved by the locking segment 227.

3. Structure and Power Transmission of Discharge-Roller Driving Gear Train

The discharge-roller driving gear train 87 is configured to transmit the rotation of the pinion gear 203 of the driving motor 201 to the discharge-roller driving gear 89 attached to the discharge-roller driving shaft 91 provided with the discharge driving roller 15 via transmission gears 250, 251, 252, and 88 and the discharge planetary-gear mechanism 231.

Specifically, the discharge-roller driving gear train 87 includes the transmission gear 250 having a large-diameter gear portion 250a meshed with the pinion gear 203 of the driving motor 201 and a small-diameter gear portion 250*b* formed integrally with the large-diameter gear portion 250*a*, the transmission gear 251 meshed with the small-diameter gear portion 250*b* of the transmission gear 250, the transmission gear 252 meshed with the transmission gear 251, the discharge planetary-gear mechanism 231 provided with a sun gear 233 having a large-diameter gear portion 233*a* meshed with the transmission gear 252, and the transmission gear 88 having a large-diameter gear portion 88*a* meshed with the large-diameter gear portion 233*a* of the sun gear 233 and a small-diameter gear portion 88*b* formed integrally with the large-diameter gear portion 88*a*.

The discharge planetary-gear mechanism 231 includes the sun gear 233 having the large-diameter gear portion 233*a* meshed with the transmission gear 252 and a small-diameter gear portion 233*b* formed integrally with the large-diameter gear portion 233*a*, a rocking arm 237 that rocks about a rotation shaft 235 of the sun gear 233, a first planetary gear 239 supported by a first end of the rocking arm 237, and a second planetary gear 241 supported by a second end of the rocking arm 237.

The first planetary gear 239 and the second planetary gear 241 are configured to mesh with the small-diameter gear portion 233*b* of the sun gear 233 with the small-diameter gear portion 233*b* interposed therebetween.

As shown in FIG. 8, when the pinion gear 203 of the driving motor 201 rotates in the reverse direction CW, power is transmitted to the transmission gear 250, the transmission gear 251, the transmission gear 252, the sun gear 233, the transmission gear 88, and the discharge-roller driving gear 89 in that order, as shown with arrows in FIG. 8, thereby rotating the discharge driving roller 15 in the entry direction F for making the sheet P enter the inversion path 27.

On the other hand, as shown in FIG. 9, when the pinion gear 203 of the driving motor 201 rotates in the forward direction CCW, power is transmitted to the transmission gear 250, the transmission gear 251, the transmission gear 252, the sun gear 233, the transmission gear 88, and the discharge-roller driving gear 89 in that order, as shown with arrows in FIG. 9, thereby rotating the discharge driving roller 15 in the discharging direction E for discharging the sheet P outward.

Therefore, the discharge-roller driving gear train 87 is configured such that the rotating direction of the discharge driving roller 15 is switched between the discharging direction E and the entry direction F in response to the switching of the rotating direction of the driving motor 201 between the forward direction CCW and the reverse direction CW.

A transmission gear 253 for driving a rotary encoder (not shown) that detects the speed of rotation and the rotational angle of the pinion gear 203 of the driving motor 201 is provided in the vicinity of the transmission gear 250. The transmission gear 253 is a gear formed by integrating a large-diameter gear portion 253*a* and a small-diameter gear portion 253*b* with each other and is rotatable since the large-diameter gear portion 250*a* of the transmission gear 250 is meshed with the small-diameter gear portion 253*b* of the transmission gear 253.

4. Structure and Power Transmission of Feed-Roller Driving Gear Train

The feed-roller driving gear train 255 is configured to extract the rotation of the pinion gear 203 of the driving motor 201 from the first planetary gear 239 or the second planetary gear 241 of the discharge planetary-gear mechanism 231 to a transmission gear 257, and then transmit the rotation to a feed-roller driving shaft 48 provided with the feed roller 47 via a first feed planetary-gear mechanism 259 and a second feed planetary-gear mechanism 265.

The first feed planetary-gear mechanism 259 includes a sun gear 261 meshed with the transmission gear 257, a first rocking arm 263 that rocks about a rotation shaft 262 of the sun gear 261, and a first planetary gear 264 rotatably provided on a free end of the first rocking arm 263 and meshed with the sun gear 261.

The second feed planetary-gear mechanism 265 includes the sun gear 261 shared with the first feed planetary-gear mechanism 259, a second rocking arm 266 that rocks about the rotation shaft 262 of the sun gear 261, a second planetary gear 269 rotatably provided on a free end of the second rocking arm 266, a transmission gear 268 meshed with the second planetary gear 269 and rotatably provided on the second rocking arm 266, and a transmission gear 267 meshed with the transmission gear 268 and rotatably provided on the second rocking arm 266.

The transmission gear 267 is disposed on a rocking path of the first planetary gear 264 and is configured to receive the rotation of the first planetary gear 264 when meshed with the first planetary gear 264.

As shown in FIG. 8, when the pinion gear 203 of the driving motor 201 rotates in the reverse direction CW, the first planetary gear 239 of the discharge planetary-gear mechanism 231 meshes with the transmission gear 257 so that power is transmitted to the first planetary gear 239, the transmission gear 257, the sun gear 261, the first planetary gear 264, the transmission gear 267, the transmission gear 268, and the second planetary gear 269 in that order, as shown with arrows in FIG. 8, thereby rotating the feed roller 47 in the feeding direction G for guiding the sheet P to the transport path 19.

On the other hand, as shown in FIG. 9, when the pinion gear 203 of the driving motor 201 rotates in the forward direction CCW, the second planetary gear 241 of the discharge planetary-gear mechanism 231 meshes with the transmission gear 257 so that power is transmitted to the second planetary gear 241, the transmission gear 257, and the sun gear 261 in that order, as shown with arrows in FIG. 9. This causes the first rocking arm 263 and the second rocking arm 266 to rock in directions indicated by arrows, thereby blocking the transmission of power to the feed roller 47 as well as shifting the feed roller 47 to a retreated position away from the sheet P.

5. Structure and Power Transmission of Cam Driving Gear Train

The cam driving gear train 93 is configured to extract the rotation of the pinion gear 203 of the driving motor 201 from the discharge-roller driving gear 89 to a second transmission gear 96 and then transmit the rotation to the cam driving gear 57 via the cam driving planetary-gear mechanism 95 and an intermediate gear 105.

Specifically, the cam driving gear train 93 includes the cam driving planetary-gear mechanism 95 and the intermediate gear 105. The cam driving planetary-gear mechanism 95 includes the second transmission gear 96 having a large-diameter gear portion 96*a* meshed with the discharge-roller driving gear 89 and a small-diameter gear portion 96*b* formed integrally with the large-diameter gear portion 96*a*, a sun gear 97 having a large-diameter gear portion 97*a* meshed with the small-diameter gear portion 96*b* of the second transmission gear 96 and a small-diameter gear portion 97*b* formed integrally with the large-diameter gear portion 97*a*, a rocking arm 99 that rocks about a rotation shaft 98 of the sun gear 97, a first planetary gear 101 supported by a first end of the rocking arm 99, and a second planetary gear 103 supported by a second end of the rocking arm 99. The intermediate gear 105 is provided on a rocking path of the second planetary gear 103 and is meshed with the cam driving gear 57.

The first planetary gear 101 and the second planetary gear 103 are configured to mesh with the small-diameter gear portion 97b of the sun gear 97 with the small-diameter gear portion 97b interposed therebetween.

The cam driving gear 57 is provided with a partially-toothed portion 109 having a home-position depression 111 formed in a part of the peripheral surface thereof, and an all-toothed portion 107 having gear teeth formed around the entire peripheral surface thereof. The intermediate gear 105 is provided at a position where it meshes with the partially-toothed portion 109, and the first planetary gear 101 is provided at a position where it is meshable with the all-toothed portion 107.

As shown in FIG. 8, when the pinion gear 203 of the driving motor 201 rotates in the reverse direction CW, the discharge-roller driving gear 89 rotates in the entry direction F for making the sheet P enter the inversion path 27 so that power is transmitted to the discharge-roller driving gear 89, the second transmission gear 96, the sun gear 97, the first planetary gear 101, and the all-toothed portion 107 of the cam driving gear 57 in that order, as shown with arrows in FIG. 8, thereby rotating the cam driving gear 57 in a predetermined driving direction H.

On the other hand, as shown in FIG. 9, when the pinion gear 203 of the driving motor 201 rotates in the forward direction CCW, the discharge-roller driving gear 89 rotates in the discharging direction E for discharging the sheet P outward so that power is transmitted to the discharge-roller driving gear 89, the second transmission gear 96, the sun gear 97, the second planetary gear 103, the intermediate gear 105, and the partially-toothed portion 109 of the cam driving gear 57 in that order, as shown with arrows in FIG. 9, thereby rotating the cam driving gear 57 in the same predetermined driving direction H.

Therefore, the cam driving gear train 93 is configured such that the cam driving gear 57 always rotates in the predetermined driving direction H whether the rotating direction of the driving motor 201 is switched to the forward direction CCW or the reverse direction CW.

In response to the rotation of the cam driving gear 57 in the driving direction H, the nip-release switching mechanism 55 that switches the discharge roller 13 between the nip position and the release position at a predetermined timing is driven.

6. Structure of Nip-Release Switching Mechanism

As shown in FIGS. 2, 22, 27, and 28, the nip-release switching mechanism 55 includes the cam driving gear 57, a cam shaft 59 having the cam driving gear 57 at a first end thereof and extending horizontally toward the center of the transport path 19 in a width direction B thereof, two sets of release cams 61 and 61 as an example at a second end of the cam shaft 59, two sets of cam followers 63 and 63 individually abutting on the respective release cams 61 and 61, a roller holder 18, for the discharge driven roller 17, provided integrally with the two sets of cam followers 63 and 63 and configured to rock about a rocking shaft (not shown) in a fixed angular range, and a bias member 65 formed of, for example, a compression coil spring that biases the roller holder 18 so as to make the discharge driven roller 17 move toward the discharge driving roller 15.

Figure 27:
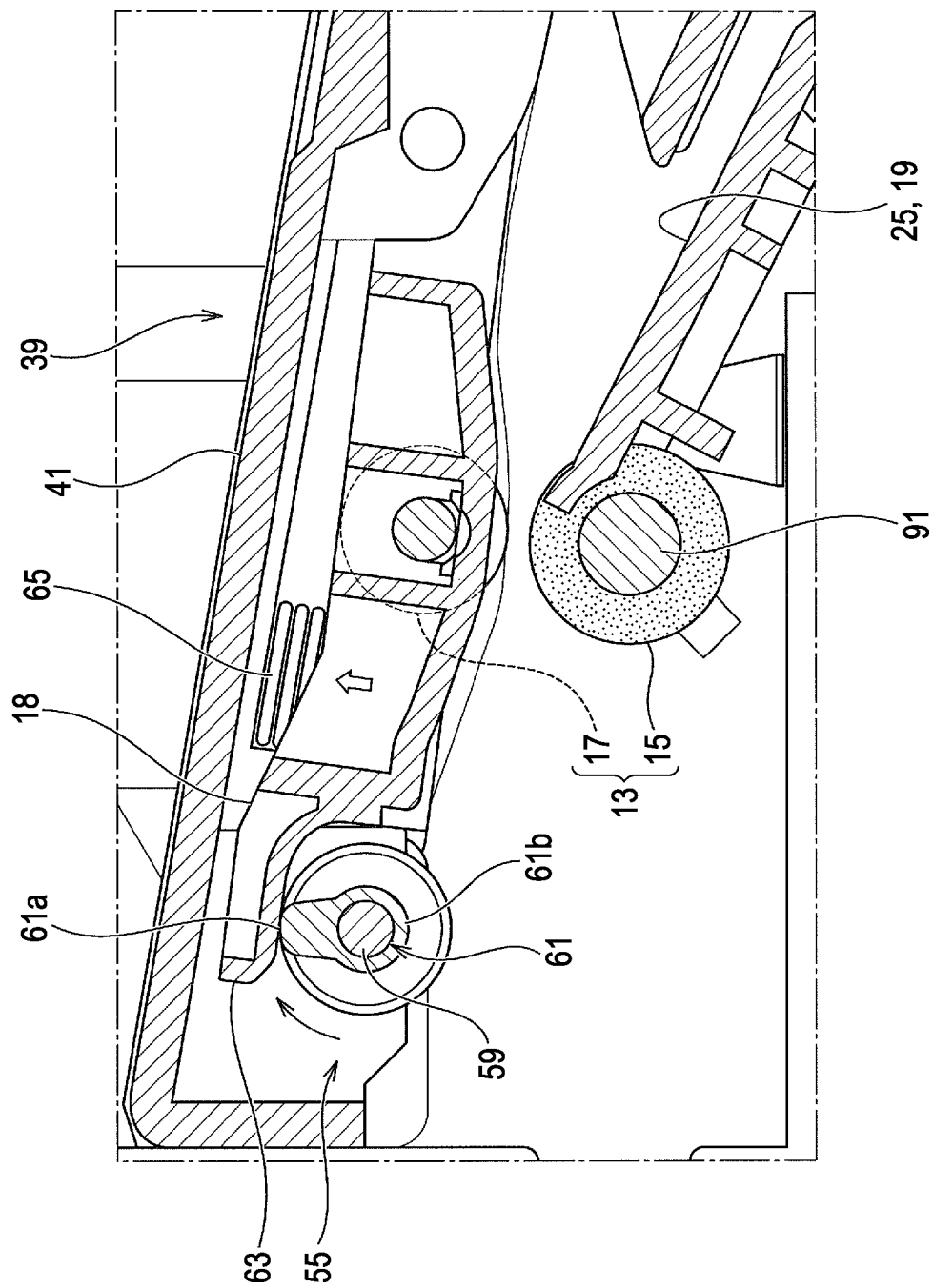
FIG. 27 is an enlarged cross-sectional view showing the nip-release switching mechanism and the discharge roller and the vicinity thereof in the sheet transporting device according to the embodiment of the invention when the discharge roller is in a release position.
Figure 28:
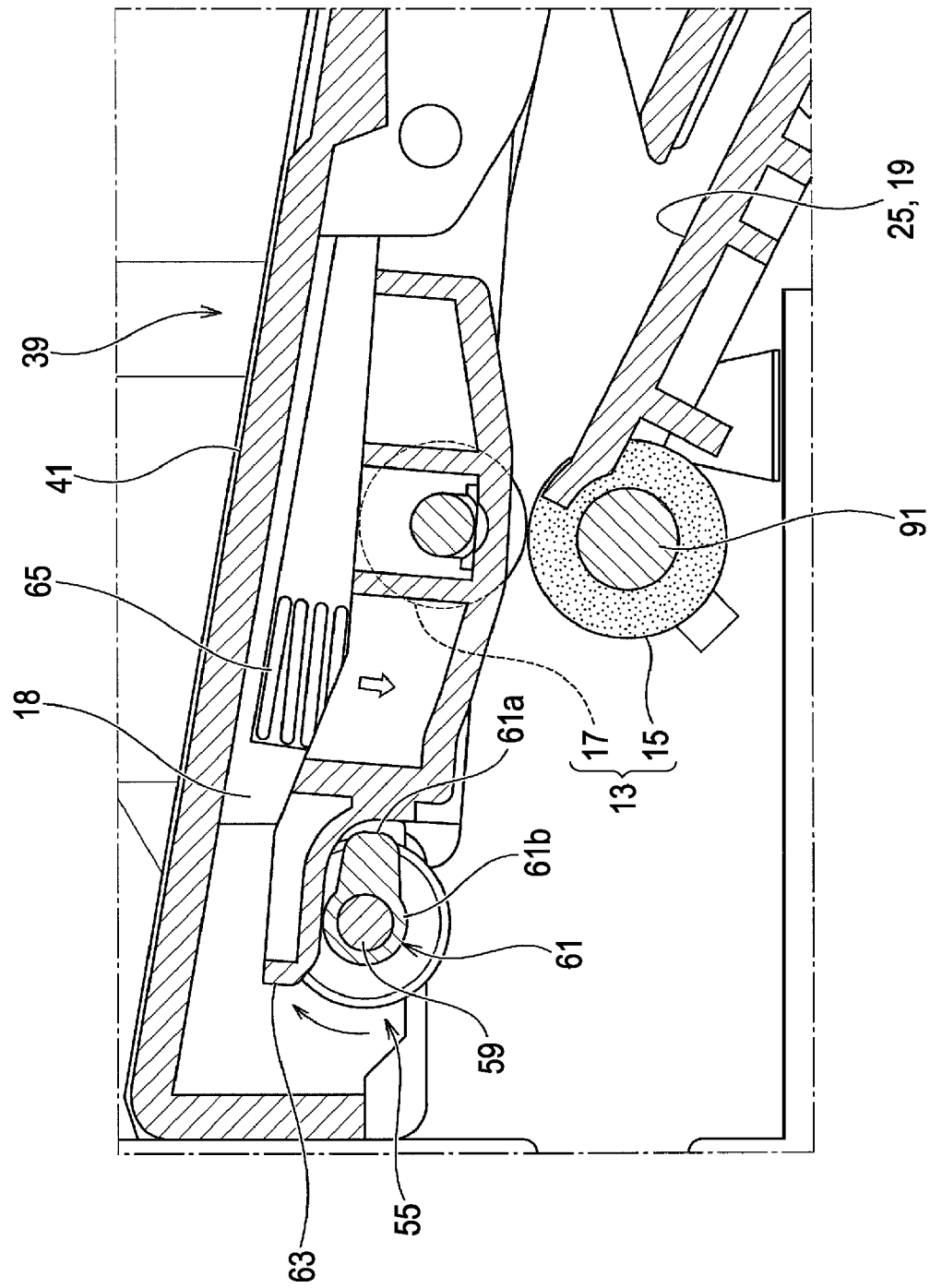
FIG. 28 is an enlarged cross-sectional view showing the nip-release switching mechanism and the discharge roller and the vicinity thereof in the sheet transporting device according to the embodiment of the invention when the discharge roller is in a nip position.

The discharge roller 13 shifts to the release position when a terminal end 61a corresponding to a maximum cam height of each release cam 61 is positioned to abut on the corresponding cam follower 63, as shown in FIG. 27. On the other hand, the discharge roller 13 shifts to the nip position when a base end 61b corresponding to a minimum cam height of the release cam 61 is positioned to abut on the cam follower 63, as shown in FIG. 28.

The timing for switching between the nip position and the release position of the discharge roller 13 is basically determined by the shape of the release cam 61. In this invention, the power-transmission blocking mechanism 291 is provided so as to achieve the capability to handle sheets P of various lengths in the transporting direction.

7. Structure of Power-Transmission Blocking Mechanism

As shown in FIGS. 2, 22 and 23 to 26, the power-transmission blocking mechanism 291 includes an engaged portion 293 provided in the rocking arm 99 of the cam driving planetary-gear mechanism 95, and an engaging portion 307 whose engagement position relative to the engaged portion 293 changes by switching the rocking direction of the rocking arm 99.

When the engaging portion 307 reaches a cam-drive stop position, the transmission of power from the cam driving planetary-gear mechanism 95 to the cam driving gear 57 is blocked.

The engaging portion 307 is capable of moving in a certain direction around the engaged portion 293 along a movement path 301 formed therearound in response to the switching of the rocking direction of the rocking arm 99.

Specifically, the engaged portion 293 includes a first engagement projection 297 and a second engagement projection 299 that are provided in an extension segment 295 extending from the rocking arm 99.

In this embodiment, the first engagement projection 297 and the second engagement projection 299 are wall-like members projecting orthogonally from the extension segment 295 and serve as guide surfaces that guide the movement of the engaging portion 307 when the engaging portion 307 abuts on inner and outer wall surfaces of the first engagement projection 297 and the second engagement projection 299.

Furthermore, the first engagement projection 297 and the second engagement projection 299 are separated from each other by a predetermined distance for allowing the engaging portion 307 to pass therebetween. Specifically, the first engagement projection 297 and the second engagement projection 299 have a guide path 303 formed therebetween for guiding the engaging portion 307 to the cam-drive stop position.

A part of the wall surface of the first engagement projection 297 facing the guide path 303 is provided with a hook portion 305. When the engaging portion 307 of the power-transmission blocking mechanism 291 is located at a predetermined engagement position relative to the engaged portion 293, the first planetary gear 101 and the second planetary gear 103 are both kept away from the cam driving gear 57. Specifically, a position at which the engaging portion 307 engages with the hook portion 305 serves as the aforementioned predetermined engagement position (i.e., the cam-drive stop position). Therefore, when the engaging portion 307 engages with the hook portion 305, the rocking of the rocking arm 99 is stopped at an intermediate point, thereby achieving a non power transmission state in which power is not transmitted from the first planetary gear 101 and the second planetary gear 103 to the cam driving gear 57.

The engaging portion 307 is movable in accordance with a change in the rocking position of the rocking arm 99, and receives a bias force that always tries to set the engaging portion 307 at a predetermined neutral position.

Specifically, the engaging portion 307 is formed by bending a terminal end of a bar-spring-like elastic support rod 309, whose base end is held by a spring-securing portion 311, by about 90°.

Operation Modes of Sheet Transporting Device

Next, operation modes of the sheet transporting device 31 according to this embodiment having the above-described configuration will be described. The operation modes include an operation mode (A) mainly for sheet transportation performed by operating the feed roller 47, the transport roller 7, the discharge roller 13, and the arm locking mechanism 225 in conjunction with each other, an operation mode (B) mainly for switching between the nip position and the release position of the discharge roller 13 by operating the discharge roller 13, the cam driving gear train 93, and the nip-release switching mechanism 55 in conjunction with each other, and an operation mode (C) of the power-transmission blocking mechanism 291 for keeping the discharge roller 13 in the release position for a predetermined period of time.

A. Operation Mode Mainly for Sheet Transportation (see FIGS. 10 to 21)

FIGS. 10 to 21 are side views schematically illustrating the operation principle of the arm locking mechanism 225 and the flow of sheet transportation. Specifically, FIGS. 10 to 21 are operation principle diagrams in which the configurations of the arm locking mechanism 225 and the driving gear trains 205, 87, and 255 are simplified for the ease of understanding, and in which the structures of the driving gear trains shown in FIGS. 8 and 9 are partially omitted.

1. Start of First-Face Transportation and Execution of Skew Correction (see FIGS. 10 and 11)

When the pinion gear 203 of the driving motor 201 is rotated in the forward direction CCW at the start of first-face transportation, power is transmitted as shown with arrows in FIG. 10 so that the rotation of the sun gear 261 is directly transmitted to the transmission gear 267, thereby rotating the feed roller 47 in the feeding direction G.

Furthermore, the rotation of the pinion gear 203 is transmitted to the transport driving roller 9 via the transport planetary-gear mechanism 207, thereby rotating the transport roller 7 in the transporting direction A. At this time, the locking segment 227 of the arm locking mechanism 225 is in engagement with the latching portion 223 so as to lock the rocking of the rocking arm 213 of the transport planetary-gear mechanism 207. Consequently, the transmission of power from the first planetary gear 215 via the intermediate gear 219 is maintained.

When the pinion gear 203 of the driving motor 201 is rotated in the reverse direction CW in this state, power is transmitted as shown with arrows in FIG. 11, thereby rotating the transport roller 7 in the returning direction D. Furthermore, the rotation of the pinion gear 203 is transmitted to the feed roller 47 via the discharge planetary-gear mechanism 231, thereby rotating the feed roller 47 in the returning direction D. As a result of this operation, skew correction is performed on the sheet P by a so-called bite-and-discharge method.

Although not shown, the feed-roller driving shaft 48 provided with the feed roller 47 and the second planetary gear 269 that transmits power to the feed-roller driving shaft 48 have certain play therebetween in the rotating direction. Therefore, a rotational delay occurs in the feed roller 47 by an amount equivalent to the play, causing the sheet P pinched between the feed roller 47 and the transport roller 7 to bend. Consequently, the skew correction can be appropriately and reliably performed.

2. Resuming of First-Face Transportation and Midpoint of First-Face Transportation (see FIGS. 12 and 13)

When the pinion gear 203 of the driving motor 201 is rotated in the forward direction CCW after performing the skew correction, the transport roller 7 rotates in the transporting direction A so as to transport the sheet P downstream. When the sheet P undergoing the transportation again comes into abutment with the unlocking lever 228, the locking arm 229 rotates clockwise in FIG. 12 so as to disengage the locking segment 227 from the latching portion 223.

Furthermore, since the sun gear 261 and the transmission gear 267 are unmeshed with each other in this state, the feed roller 47 moves away from the sheet P, whereby the transmission of power to the feed roller 47 is blocked. Therefore, back tension acting on the sheet P can be reduced.

Figure 13:
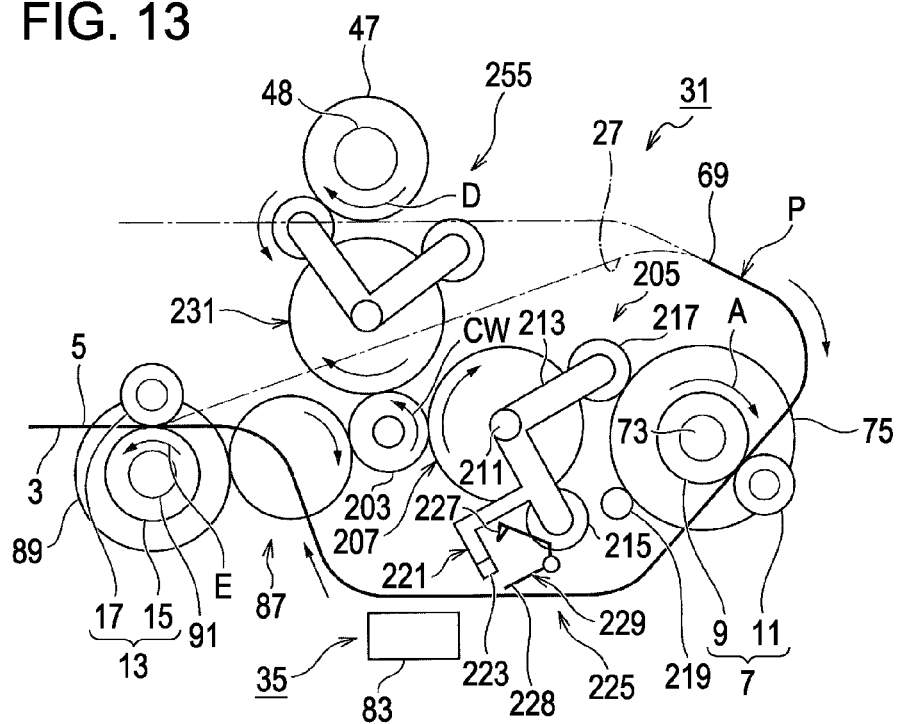
FIG. 13 is a side view showing the operation principle of the arm locking mechanism of the sheet transporting device according to the embodiment of the invention and the flow of sheet transportation at a midpoint of the first-face transportation.

Subsequently, as shown in FIG. 13, the rotating direction of the pinion gear 203 of the driving motor 201 is switched from the forward direction CCW to the reverse direction CW. The rotation of the pinion gear 203 in the reverse direction CW causes the rocking arm 213 to rock, thereby causing the second planetary gear 217 to mesh with the transport-roller driving gear 75, as shown in FIG. 13. Thus, the rotation is transmitted to the transport roller 7 in the same transporting direction A.

On the other hand, the discharge roller 13 receives the rotation in a direction indicated by an arrow in FIG. 13, whereby the discharge roller 13 rotates in the discharging direction E for discharging the sheet P outward. In this state, the sun gear 261 and the transmission gear 267 are meshed with each other so as to rotate the feed roller 47 in the returning direction D, as shown in FIG. 13, or the transmission of power between the sun gear 261 and the transmission gear 267 is blocked so as to stop continuous feeding of a subsequent sheet P.

3. Latter Half of First-Face Transportation and Start of Second-Face Transportation (see FIGS. 14 and 15)

Figure 14:
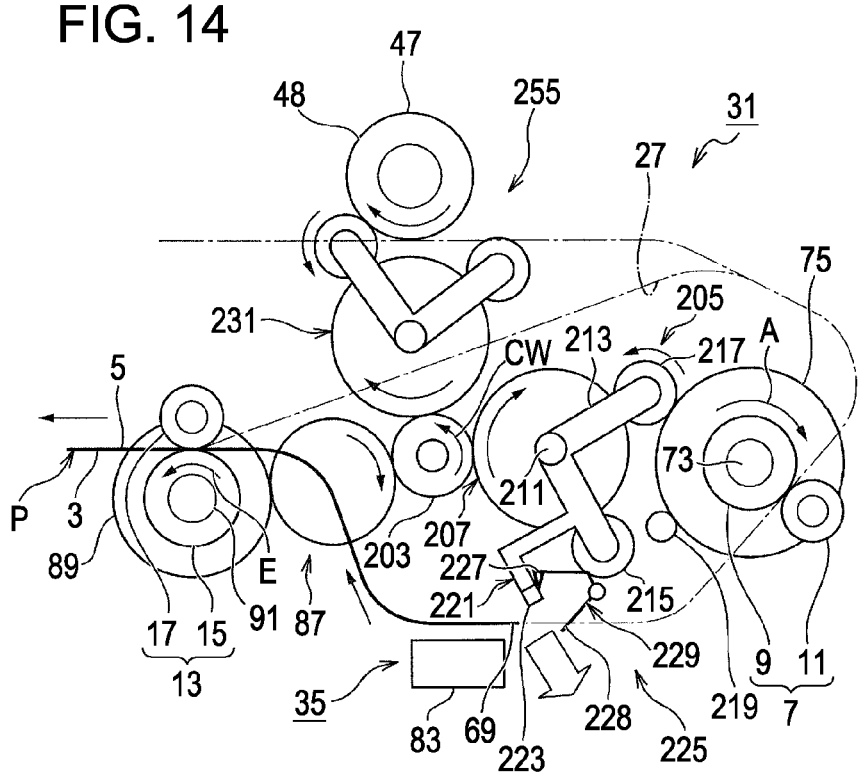
FIG. 14 is a side view showing the operation principle of the arm locking mechanism of the sheet transporting device according to the embodiment of the invention and the flow of sheet transportation during a latter half of the first-face transportation.

As shown in FIG. 14, when the trailing end of the sheet P during first-face transportation (which is to become the leading end 69 of the sheet P during second-face transportation) passes the unlocking lever 228 so that the abutment state therebetween is released, the locking arm 229 rocks in a direction indicated by an arrow in FIG. 14, thereby causing the locking segment 227 to come into abutment with a side surface of the latching portion 223.

Figure 15:
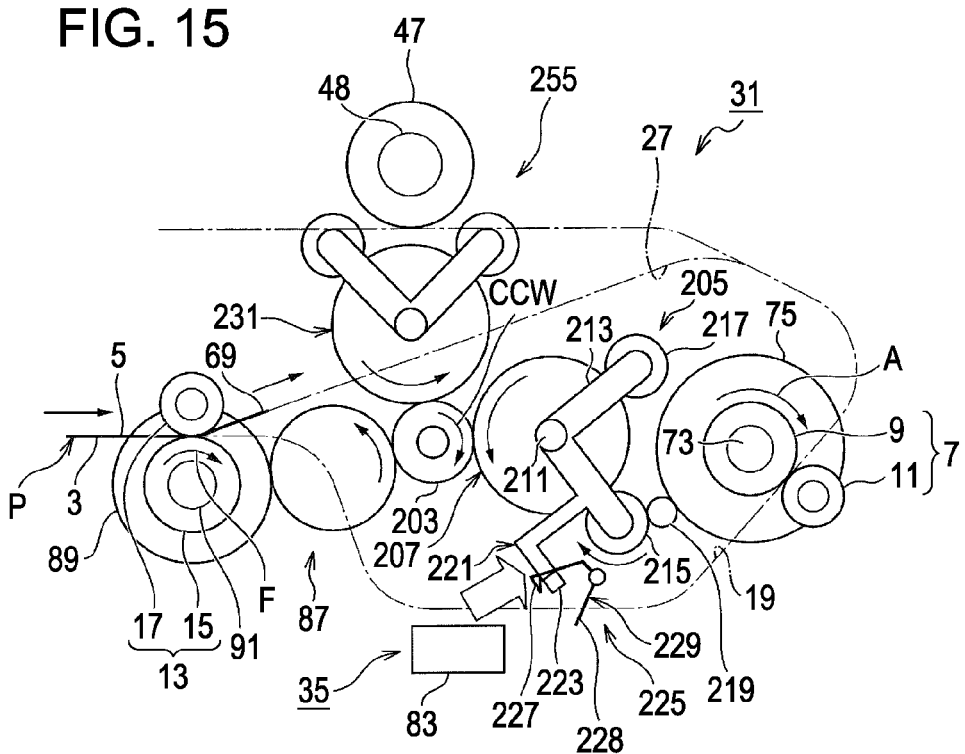
FIG. 15 is a side view showing the operation principle of the arm locking mechanism of the sheet transporting device according to the embodiment of the invention and the flow of sheet transportation when the second-face transportation is commenced.

As shown in FIG. 15, when the rotating direction of the pinion gear 203 of the driving motor 201 is switched from the reverse direction CW to the forward direction CCW just before the trailing end of the sheet P reaches the nip point of the discharge roller 13, the rotating direction of the discharge roller 13 switches from the discharging direction E to the entry direction F. Thus, second-face transportation of the sheet P is commenced, and the sheet P with its second face 5 facing upward enters the inversion path 27.

In this state, since the rotation of the pinion gear 203 is transmitted from the first planetary gear 215 to the transport-roller driving gear 75 via the intermediate gear 219, the transport roller 7 continues to rotate in the transporting direction A. Moreover, the rocking arm 213 rocks counterclockwise in FIG. 15 so as to cause the locking segment 227 to engage with the latching portion 223 again, whereby the rocking of the rocking arm 213 is restricted.

4. First Half of Second-Face Transportation and Execution of Skew Correction (see FIGS. 16 and 17)

Figure 16:
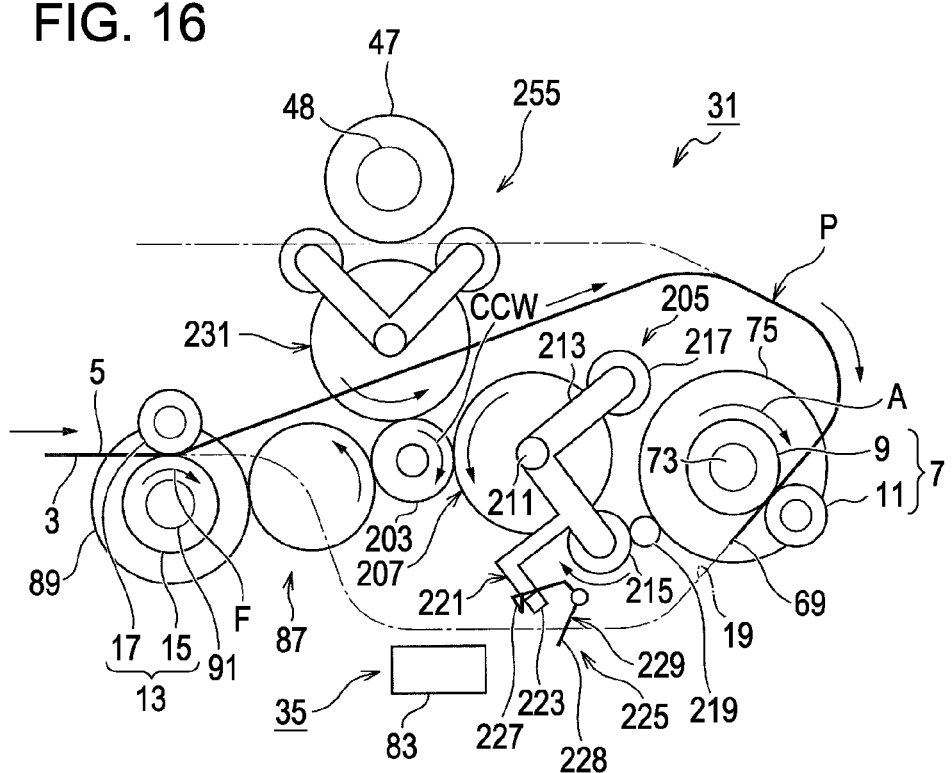
FIG. 16 is a side view showing the operation principle of the arm locking mechanism of the sheet transporting device according to the embodiment of the invention and the flow of sheet transportation during the first half of the second-face transportation.

As shown in FIG. 16, with the continuous rotation of the discharge roller 13 in the entry direction F, the sheet P enters the inversion path 27 and travels through the turn portion 23 of the transport path 19 so as to be turned over. The leading end 69 of the sheet P with its second face 5 facing downward is supplied to the nip point of the transport roller 7.

Figure 17:
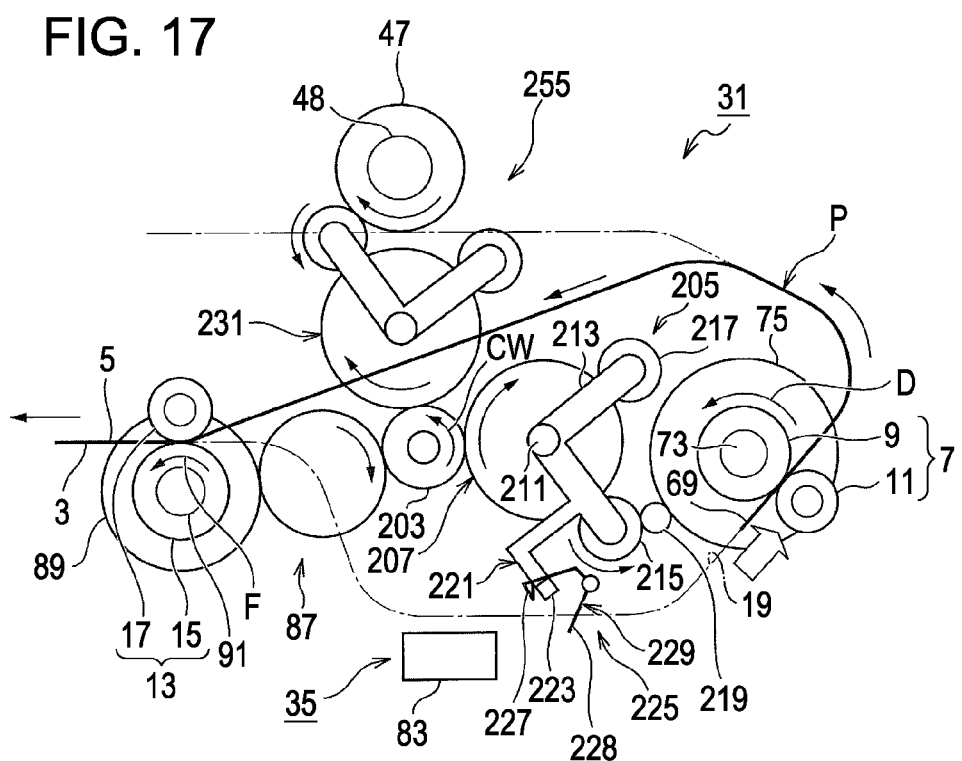
FIG. 17 is a side view showing the operation principle of the arm locking mechanism of the sheet transporting device according to the embodiment of the invention and the flow of sheet transportation when the skew correction is performed.

As shown in FIG. 17, when the rotating direction of the pinion gear 203 of the driving motor 201 is switched from the forward direction CCW to the reverse direction CW just after the leading end 69 of the sheet P passes the nip point of the transport roller 7, the transport roller 7 rotates in the returning direction D since the rocking of the rocking arm 213 in the clockwise direction in FIG. 17 is restricted by the arm locking mechanism 225.

Furthermore, since the rotating direction of the discharge roller 13 switches from the entry direction F to the discharging direction E in this state, skew correction is performed on the sheet P.

5. Resuming of Second-Face Transportation and Midpoint of Second-Face Transportation (see FIGS. 18 and 19)

Figure 18:
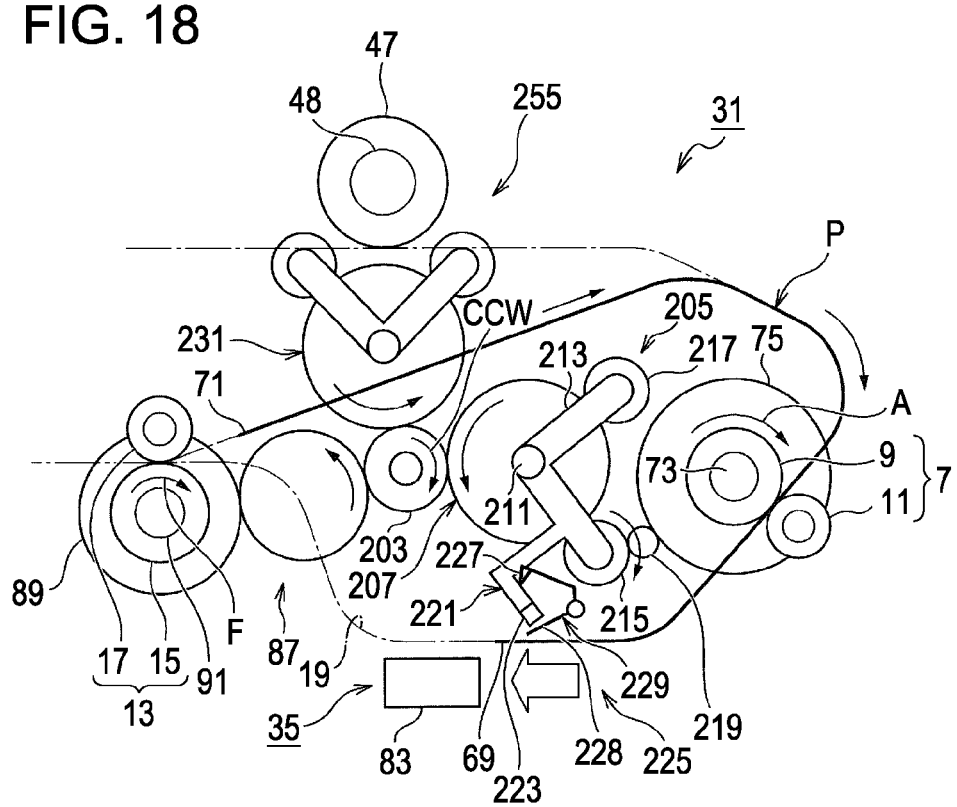
FIG. 18 is a side view showing the operation principle of the arm locking mechanism of the sheet transporting device according to the embodiment of the invention and the flow of sheet transportation when the second-face transportation is resumed.

As shown in FIG. 18, when the rotating direction of the pinion gear 203 of the driving motor 201 is switched to the forward direction CCW upon completion of the screw correction performed on the sheet P, the transportation of the sheet P in the transporting direction A resumes. The leading end 69 of the sheet P then comes into abutment with the unlocking lever 228, causing the locking segment 227 to become disengaged from the latching portion 223.

Figure 19:
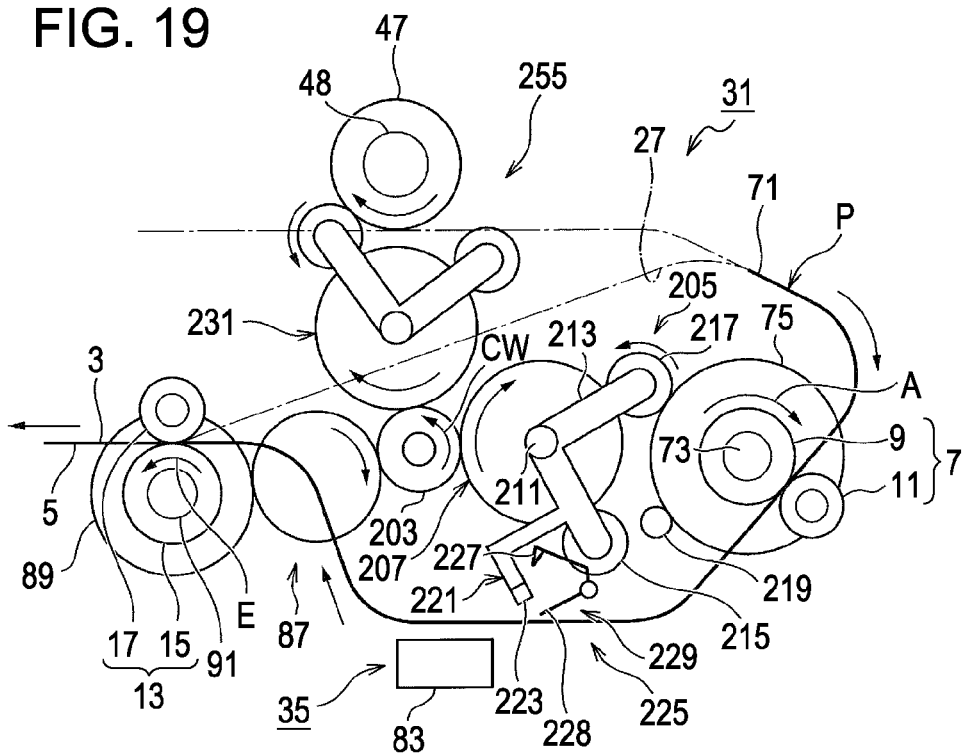
FIG. 19 is a side view showing the operation principle of the arm locking mechanism of the sheet transporting device according to the embodiment of the invention and the flow of sheet transportation at the midpoint of the second-face transportation.

When the rotating direction of the pinion gear 203 of the driving motor 201 is switched to the reverse direction CW after the locking segment 227 is disengaged from the latching portion 223, the rocking arm 213 rotates clockwise in FIG. 19 so that the rotation of the pinion gear 203 is transmitted from the second planetary gear 217 to the transport-roller driving gear 75.

Accordingly, the transport roller 7 continues to rotate in the transporting direction A, and the rotating direction of the discharge roller 13 is switched from the entry direction F to the discharging direction E, whereby the sheet P supplied to the nip point of the discharge roller 13 is discharged outward with the first face 3 thereof facing upward.

In this embodiment, the discharge roller 13 can be maintained in the release position for a predetermined period of time due to the operation of the cam driving gear train 93, to be described later, the nip-release switching mechanism 55, and the power-transmission blocking mechanism 291, thereby allowing the leading end 69 and the trailing end 71 of the sheet P to rub against each other at the nip point of the discharge roller 13 if the sheet P being transported has a great length in the transporting direction.

The discharge roller 13 shifts to the nip position before the trailing end 71 of the sheet P passes the nip point of the transport roller 7.

6. Latter Half of Second-Face Transportation and End of Second-Face Transportation (see FIGS. 20 and 21)

Figure 20:
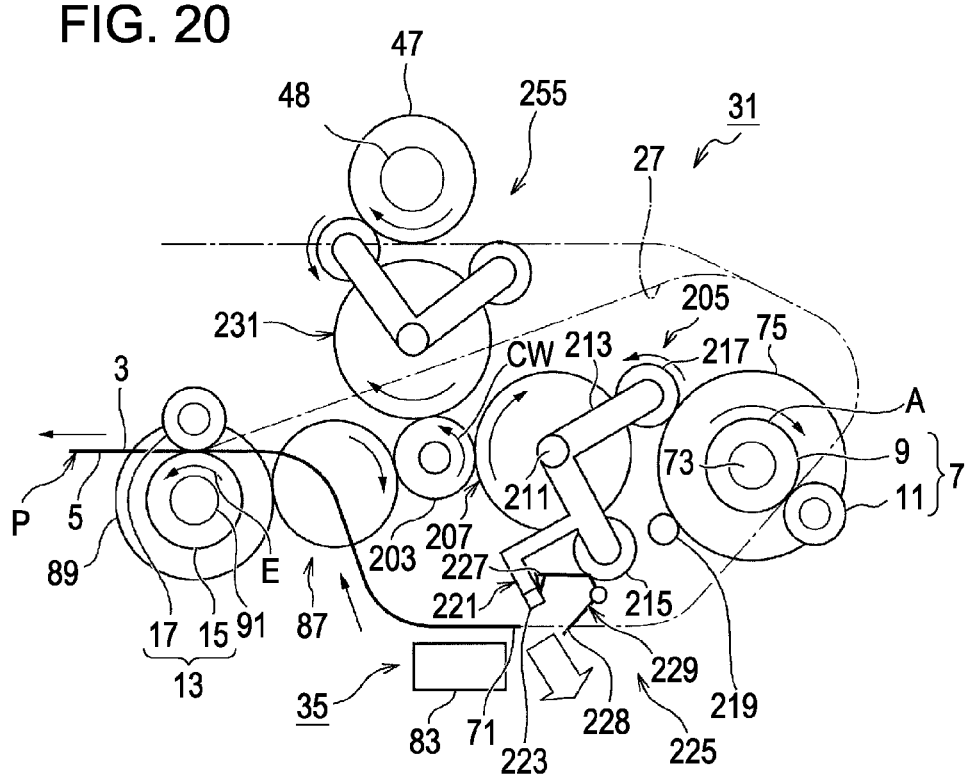
FIG. 20 is a side view showing the operation principle of the arm locking mechanism of the sheet transporting device according to the embodiment of the invention and the flow of sheet transportation during the latter half of the second-face transportation.

When the trailing end 71 of the sheet P passes the unlocking lever 228, the restricted counterclockwise rocking state of the locking arm 229 in FIG. 20 is released. Thus, the locking arm 229 becomes rockable in the counterclockwise direction in FIG. 20. Accordingly, the locking segment 227 abuts on the side surface of the latching portion 223, as shown in FIG. 20.

Figure 21:
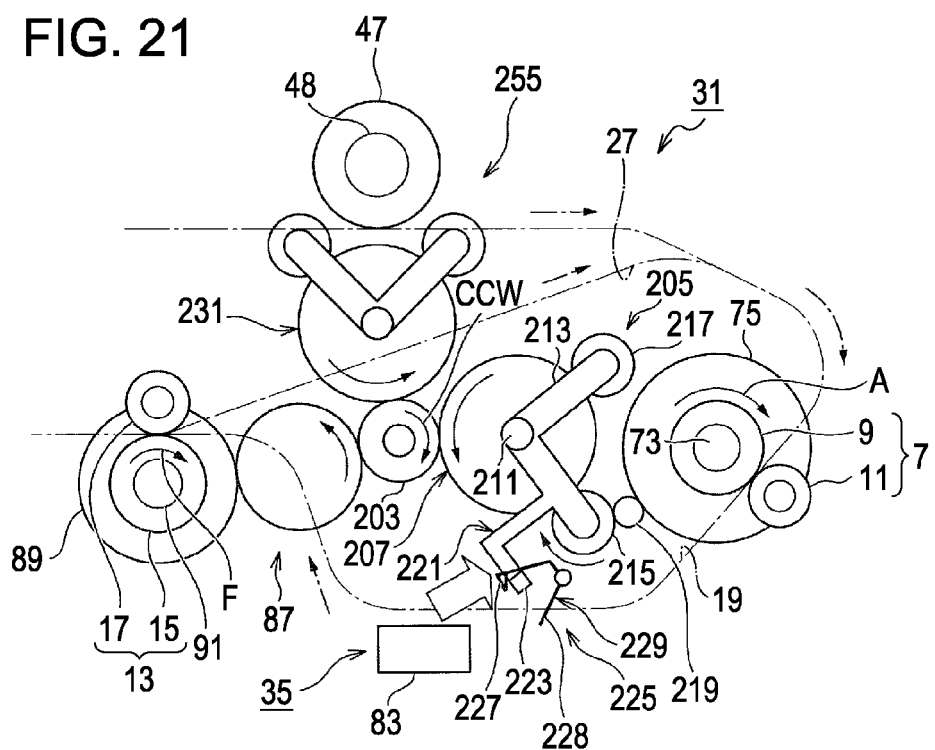
FIG. 21 is a side view showing the operation principle of the arm locking mechanism of the sheet transporting device according to the embodiment of the invention and the flow of sheet transportation when the second-face transportation is completed.
Figure 22:
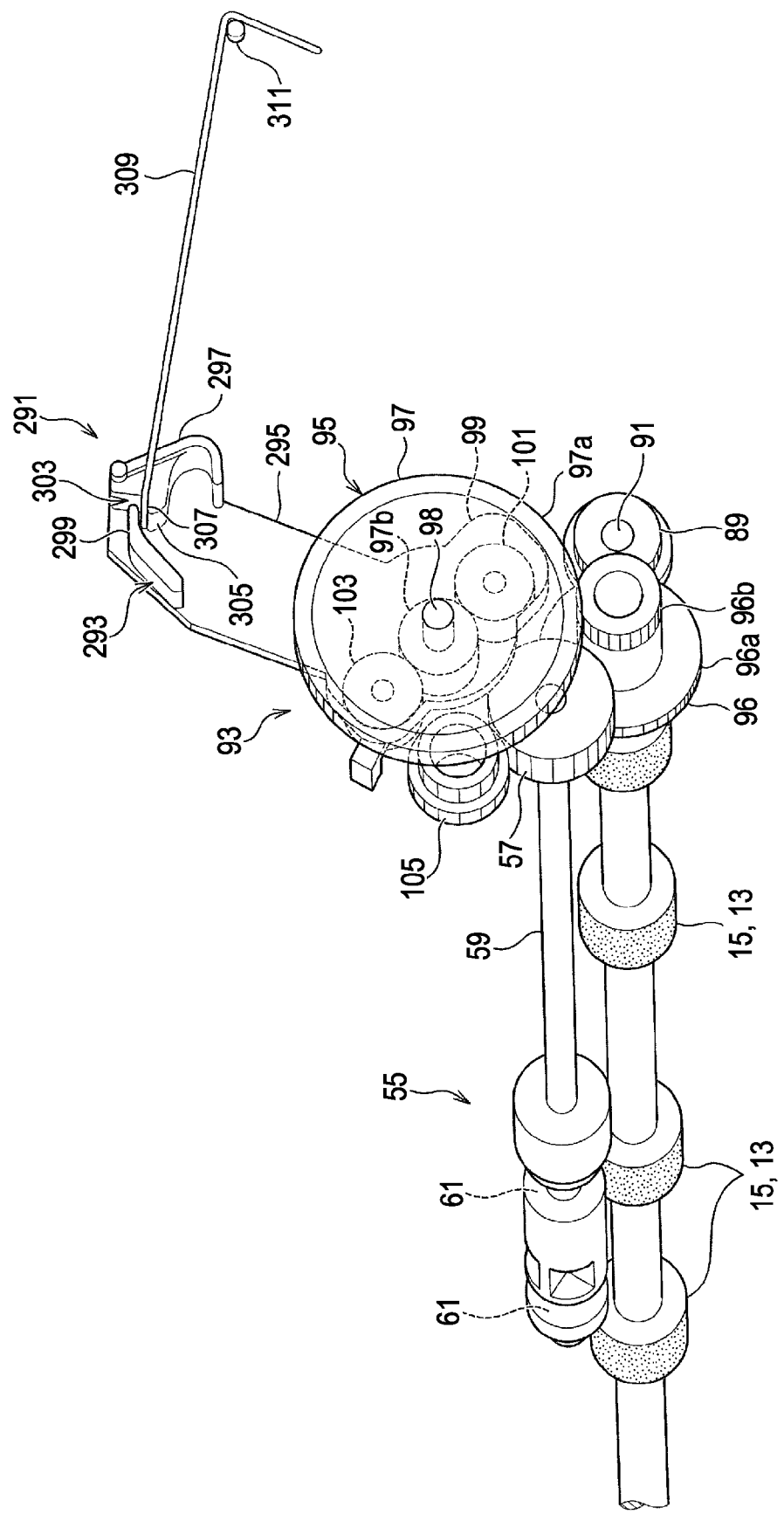
FIG. 22 is a perspective view showing the cam driving gear train and the power-transmission blocking mechanism of the sheet transporting device according to the embodiment of the invention.

Then, as shown in FIG. 21, when the rotating direction of the pinion gear 203 of the driving motor 201 is switched to the forward direction CCW, the rocking arm 213 rocks counterclockwise in FIG. 21 so as to cause the locking segment 227 to engage with the latching portion 223 again, whereby the rocking of the rocking arm 213 is restricted.

B. Operation Mode Mainly for Switching Between Nip Position and Release Position of Discharge Roller (see FIGS. 2 to 9, FIG. 27, and FIG. 28)

Next, the operation mode related to the switching between the nip position and the release position of the discharge roller 13 performed by the cam driving gear train 93 and the nip-release switching mechanism 55 will be described with reference to first-face transportation (1) and second-face transportation (2) in accordance with the flow of transportation of the sheet P.

1. First-Face Transportation (see FIGS. 3, 4, 9, and 28)

Each sheet P set on the feed tray 39 with the first face 3 thereof facing upward is fed by the feed roller 47 and is separated from a subsequent sheet P by the separation roller 49 and the separation pad 51, so that only the uppermost sheet P is fed to the transport path 19.

The sheet P fed to the transport path 19 receives a transporting force from the feed roller 47 so that the sheet P with its first face 3 thereof facing upward is sent to the first transport portion 21, and is subsequently turned over at the turn portion 23 so that the sheet P with its first face 3 facing downward is sent to the transport roller 7.

During first-face transportation, the driving motor 201 rotates in the forward direction CCW except for when skew correction is performed, so that each driving gear train receives rotation in a direction indicated by a corresponding arrow in FIG. 9. Therefore, the discharge-roller driving gear 89 rotates in the discharging direction E for discharging the sheet P outward.

Furthermore, the sun gear 97 of the cam driving planetary-gear mechanism 95 rotates counterclockwise in FIG. 9 so as to cause the second planetary gear 103 to mesh with the intermediate gear 105, thereby rotating the intermediate gear 105. At this time, since the home-position depression 111 of the cam driving gear 57 is disposed facing the intermediate gear 105, power is not transmitted to the cam driving gear 57, whereby the discharge roller 13 maintains its nip position shown in FIG. 28.

After undergoing skew correction, the sheet P supplied to the nip point of the transport roller 7 is transported toward the image processor 35 in the second transport portion 25, with the first face 3 of the sheet P facing downward, due to the rotation of the transport roller 7 in the transporting direction A transmitted via the transport-roller driving gear train 205.

In the image processor 35, the image reader 83 sequentially reads an image recorded or expressed on the first face 3 of the sheet P from a start point to an end point of the sheet P as the sheet P is transported, and stores the image as image information.

When the sheet P reaches the nip point of the discharge roller 13, the rotation of the discharge roller 13 in the discharging direction E causes the sheet P to be discharged outward of the transport path 19, and the discharging process is stopped when the sheet P is in the position shown in FIG. 4.

2. Second-Face Transportation (FIGS. 4 to 9, 27, and 28)

When the sheet P reaches the position shown in FIG. 4, the rotating direction of the driving motor 201 is switched to the reverse direction CW. Accordingly, the discharge roller 13 rotates in the entry direction F while maintaining its nip position, causing the sheet P previously discharged outward of the transport path 19 to be guided to the inversion path 27, thereby commencing second-face transportation as shown in FIG. 5.

The transmission of power when the driving motor 201 rotates in the reverse direction CW is as shown in FIG. 8. In FIG. 8, each driving gear train receives rotation in a direction indicated by a corresponding arrow. Therefore, the discharge-roller driving gear 89 receives rotation in the entry direction F for making the sheet P enter the inversion path 27.

Furthermore, the sun gear 97 of the cam driving planetary-gear mechanism 95 rotates clockwise in FIG. 8 so as to cause the first planetary gear 101 to directly mesh with the all-toothed portion 107 of the cam driving gear 57, whereby the cam driving gear 57 rotates in the driving direction H, which is the clockwise direction in FIG. 8.

The sheet P entering the inversion path 27 with the second face 5 thereof facing upward is supplied to an upstream position of the turn portion 23 in the transport path 19, and is turned over at the turn portion 23 so as to be sent to the transport roller 7 with the second face 5 facing downward.

As mentioned above, when in the normal mode, the transport roller 7 always rotates in the transporting direction A regardless of whether the rotating direction of the driving motor 201 is switched by the transport-roller driving gear train 205. Therefore, the transport roller 7 pinches the transported sheet P and transports the sheet P downstream toward the image processor 35.

As mentioned above, the rotating direction of the driving motor 201 is temporarily switched to the forward direction CCW just after the leading end 69 of the sheet P passes the transport roller 7. Then, the temporary switching of the driving motor 201 to the forward direction CCW causes the transport roller 7 to rotate in the returning direction D, as mentioned above. Thus, skew occurring in the sheet P being transported can be removed, whereby the sheet P can be set in its proper orientation before being supplied to the image processor 35.

After the skew correction, the rotation of the cam driving gear 57 receiving power from the first planetary gear 101 causes the discharge roller 13 to start moving toward the release position.

When the leading end 69 of the sheet P reaches near a midpoint between the transport roller 7 and the image processor 35 shown in FIG. 5, the rotating direction of the driving motor 201 is switched from the reverse direction CW to the forward direction CCW. As the cam driving gear 57 rotates, the discharge roller 13 gradually shifts to the release position.

Figure 6:
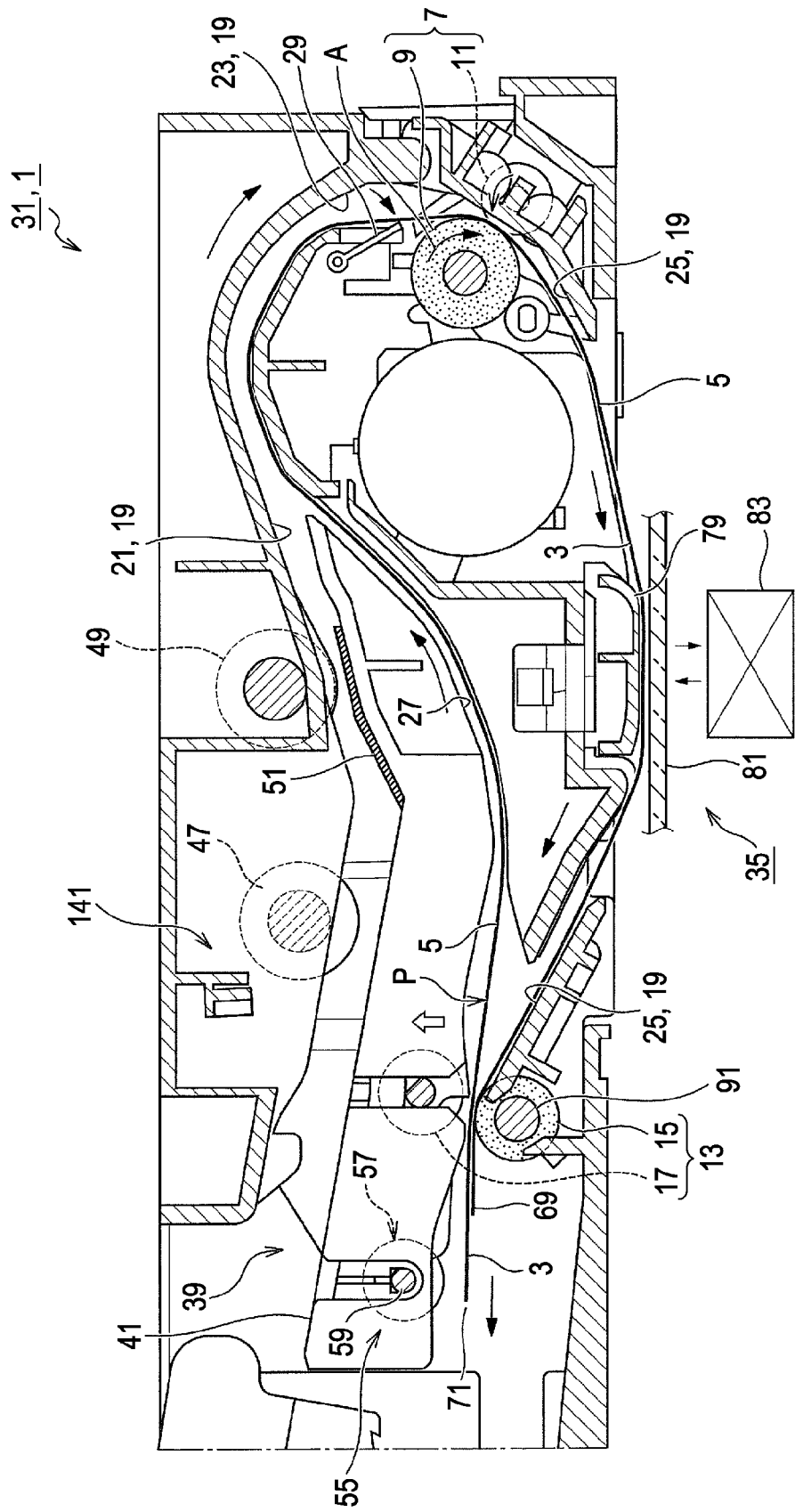
FIG. 6 is a cross-sectional view showing the internal structure of the sheet transporting device according to the embodiment of the invention at a midpoint of the second-face transportation.
Figure 7:
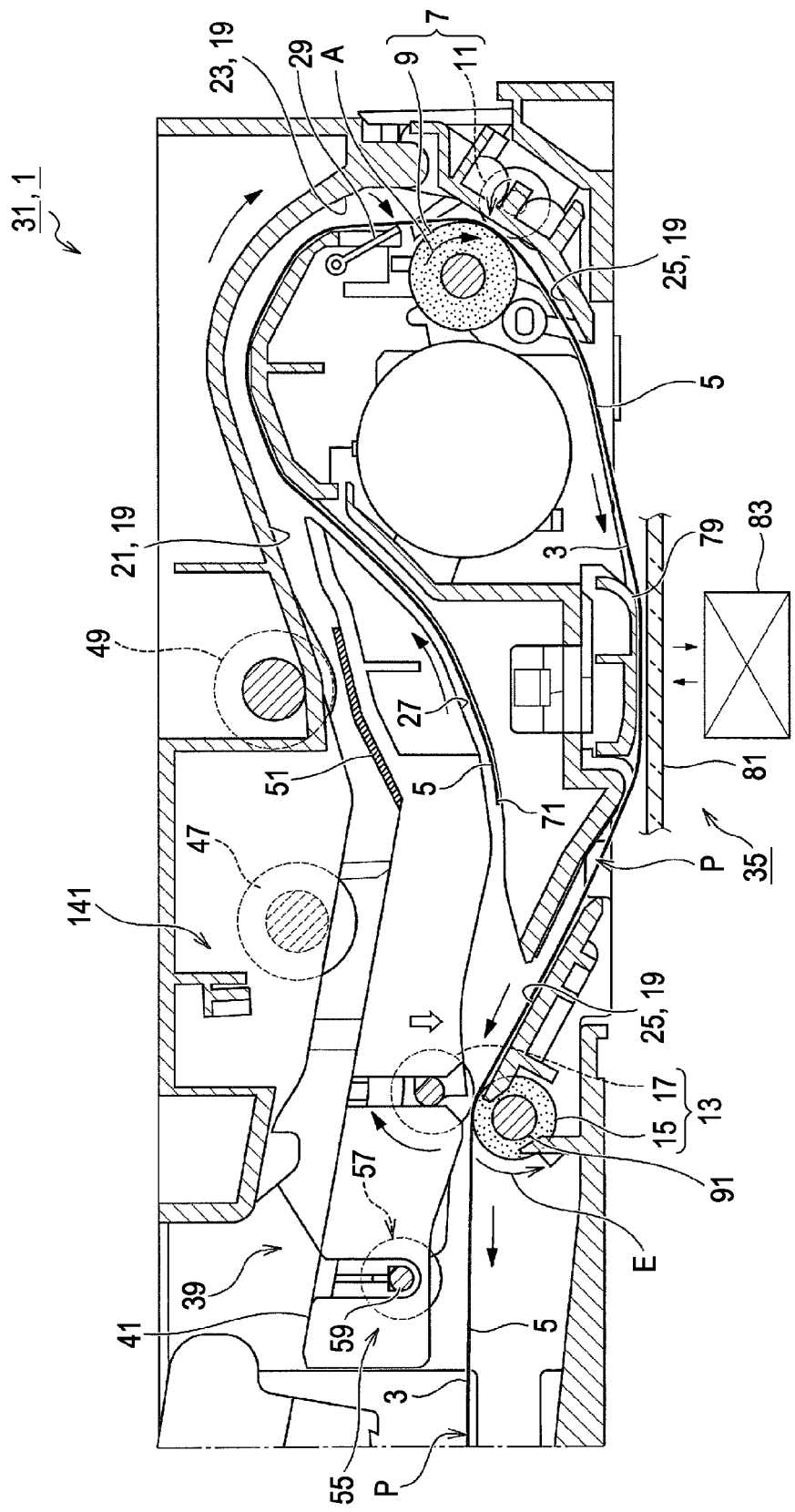
FIG. 7 is a cross-sectional view showing the internal structure of the sheet transporting device according to the embodiment of the invention during a latter half of the second-face transportation.

Regarding the sheet P passing the nip point of the transport roller 7, the image processor 35 starts reading the image information expressed on the second face 5. In the state where the leading end 69 of the sheet P has reached the nip point of the discharge roller 13, the discharge roller 13 has shifted to the release position, whereby second-face transportation is performed in a state that allows the leading end 69 and the trailing end 71 of the sheet P to rub against each other, as shown in FIG. 6.

The sheet P from which the image information is read is transported further downstream. As the cam driving gear 57 rotates, the discharge roller 13 is shifted from the release position to the nip position. When the discharge roller 13 has shifted to the nip position, the sheet P reaches the nip point of the discharge roller 13. The rotation of the discharge roller 13 in the discharging direction E causes the sheet P to be sequentially discharged outward of the transport path 19.

In this case, although the sheet P discharged from the discharge roller 13 is discharged with the first face 3 thereof facing upward, if the sheet P is to be desirably discharged with its second face 5 facing upward, the second-face transportation (2) described above may be performed again without actuating the image processor 35.

C. Operation Mode of Power-Transmission Blocking Mechanism (See FIGS. 2 and 22 to 26)

In this invention, the power-transmission blocking mechanism 291 that can adjust the period of time in which the discharge roller 13 is maintained in the release position is provided, as mentioned above, so that sheets P of various lengths in the transporting direction can be handled.

Figure 23:
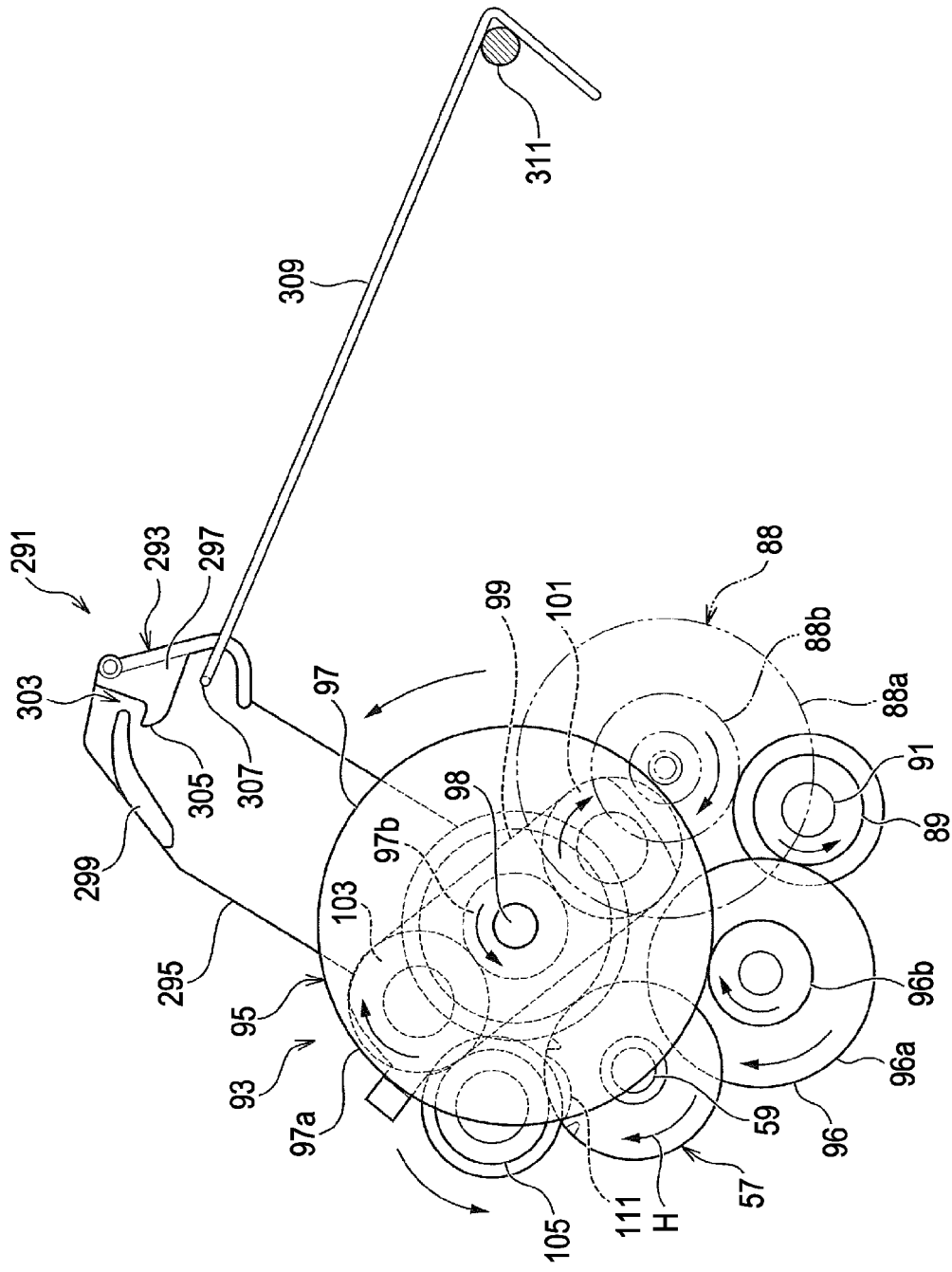
FIG. 23 is a side view showing the power-transmission blocking mechanism of the sheet transporting device according to the embodiment of the invention and illustrating a power transmission state when the cam driving gear train rotates in the forward direction.

First, as shown in FIG. 23, when the rocking of the rocking arm 99 in the cam driving planetary-gear mechanism 95 is not in a restricted state, the rotation of the pinion gear 203 of the driving motor 201 in the forward direction CCW causes the sun gear 97 to rotate counterclockwise in FIG. 23. Accordingly, since the rocking arm 99 also rocks in the same direction, the second planetary gear 103 meshes with the cam driving gear 57 via the intermediate gear 105, thereby rotating the cam driving gear 57 in the driving direction H.

Figure 24:
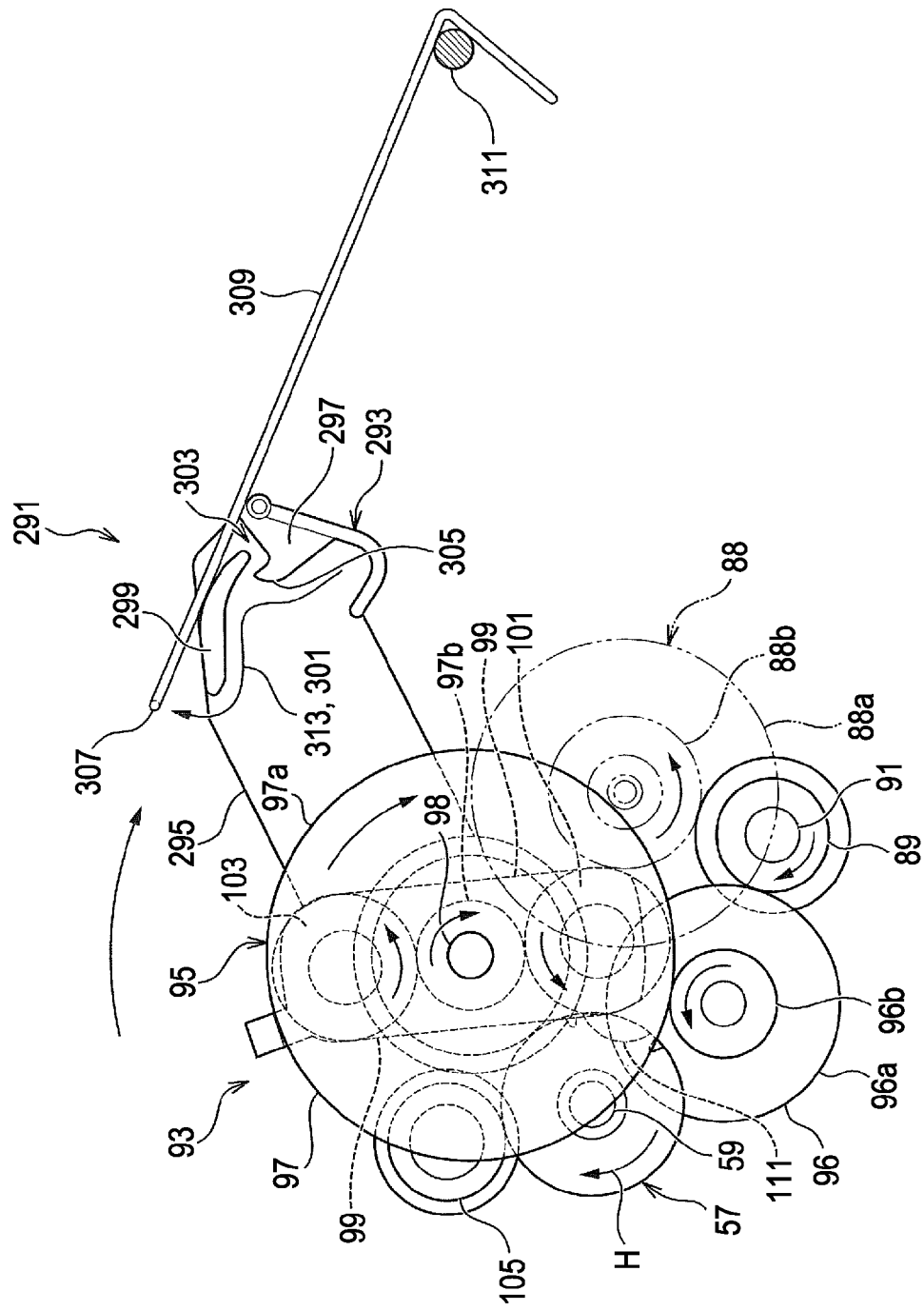
FIG. 24 is a side view showing the power-transmission blocking mechanism of the sheet transporting device according to the embodiment of the invention and illustrating a power transmission state when the cam driving gear train rotates in the reverse direction.

Next, as shown in FIG. 24, when the pinion gear 203 of the driving motor 201 is rotated in the reverse direction CW in the state shown in FIG. 23, the sun gear 97 of the cam driving planetary-gear mechanism 95 rotates clockwise in FIG. 24. Accordingly, since the rocking arm 99 also rocks in the same direction, the first planetary gear 101 directly meshes with the cam driving gear 57, thereby rotating the cam driving gear 57 in the same driving direction H.

At this time, the engaging portion 307 moves along a path indicated by an arrow 313 and is guided by the first engagement projection 297 and the second engagement projection 299 by sequentially abutting on the inner side surfaces thereof, thereby moving to a position where the elastic support rod 309 partially abuts on the outer wall surface of the second engagement projection 299 shown in FIG. 24.

Figure 25:
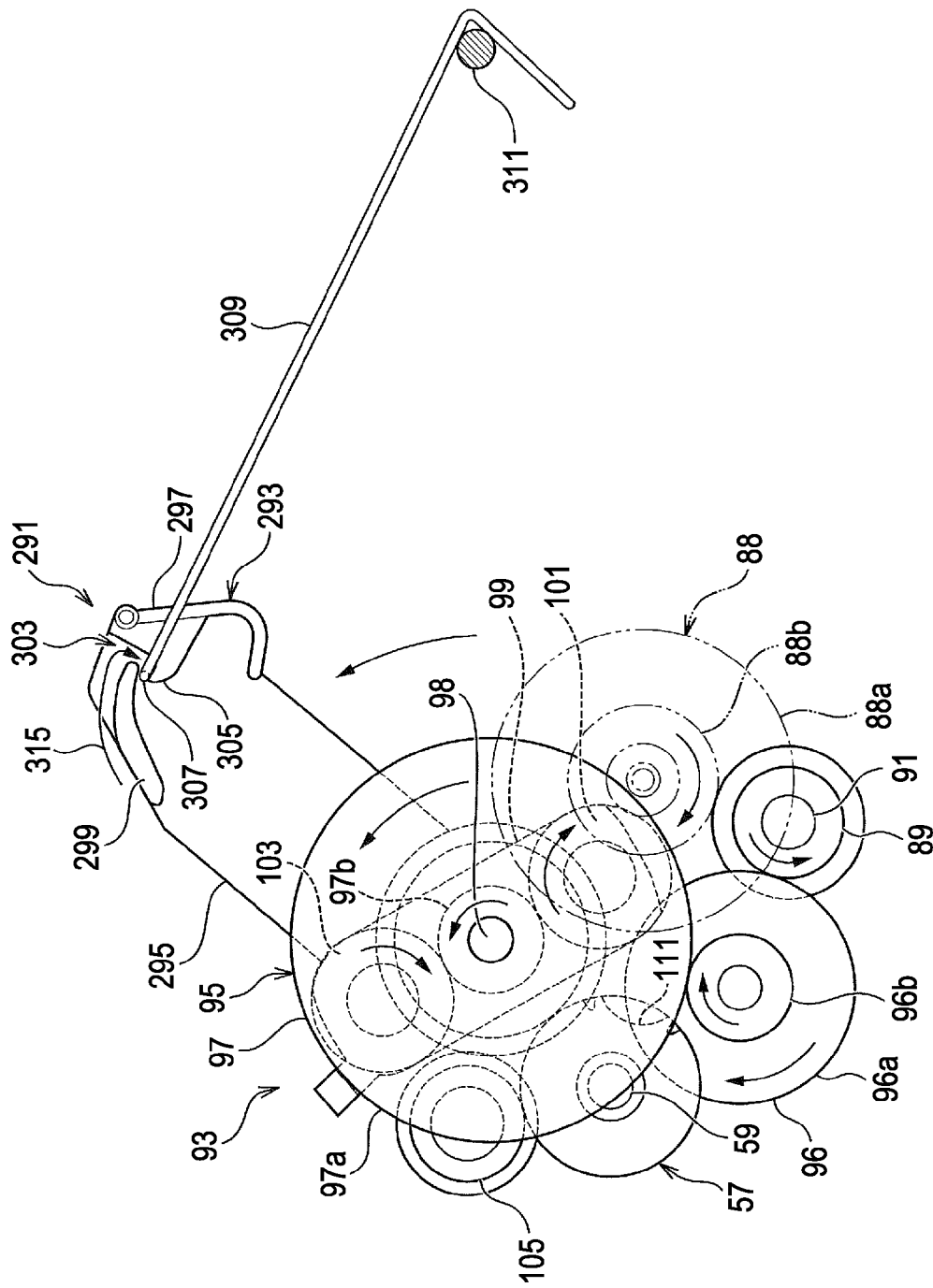
FIG. 25 is a side view showing the power-transmission blocking mechanism of the sheet transporting device according to the embodiment of the invention when the cam driving gear train is in a non power transmission state.

When the pinion gear 203 of the driving motor 201 is rotated in the forward direction CCW again in this state, the sun gear 97 of the cam driving planetary-gear mechanism 95 rotates counterclockwise in FIG. 25. As the sun gear 97 rotates, the rocking arm 99 rocks in the same direction.

At this time, the engaging portion 307 moves along a path indicated by an arrow 315. After moving rightward in FIG. 25 along the outer wall surface of the second engagement projection 299, the engaging portion 307 abuts on the inner wall surface of the first engagement projection 297 so as to be guided into the guide path 303. Then, the engaging portion 307 stops moving at the cam-drive stop position at which the engaging portion 307 engages with the hook portion 305 provided facing the terminal end of the guide path 303.

In this state, since the rocking arm 99 stops at a position just before the second planetary gear 103 meshes with the intermediate gear 105, power is not transmitted to the cam driving gear 57. Therefore, the release position of the discharge roller 13 is maintained.

Figure 26:
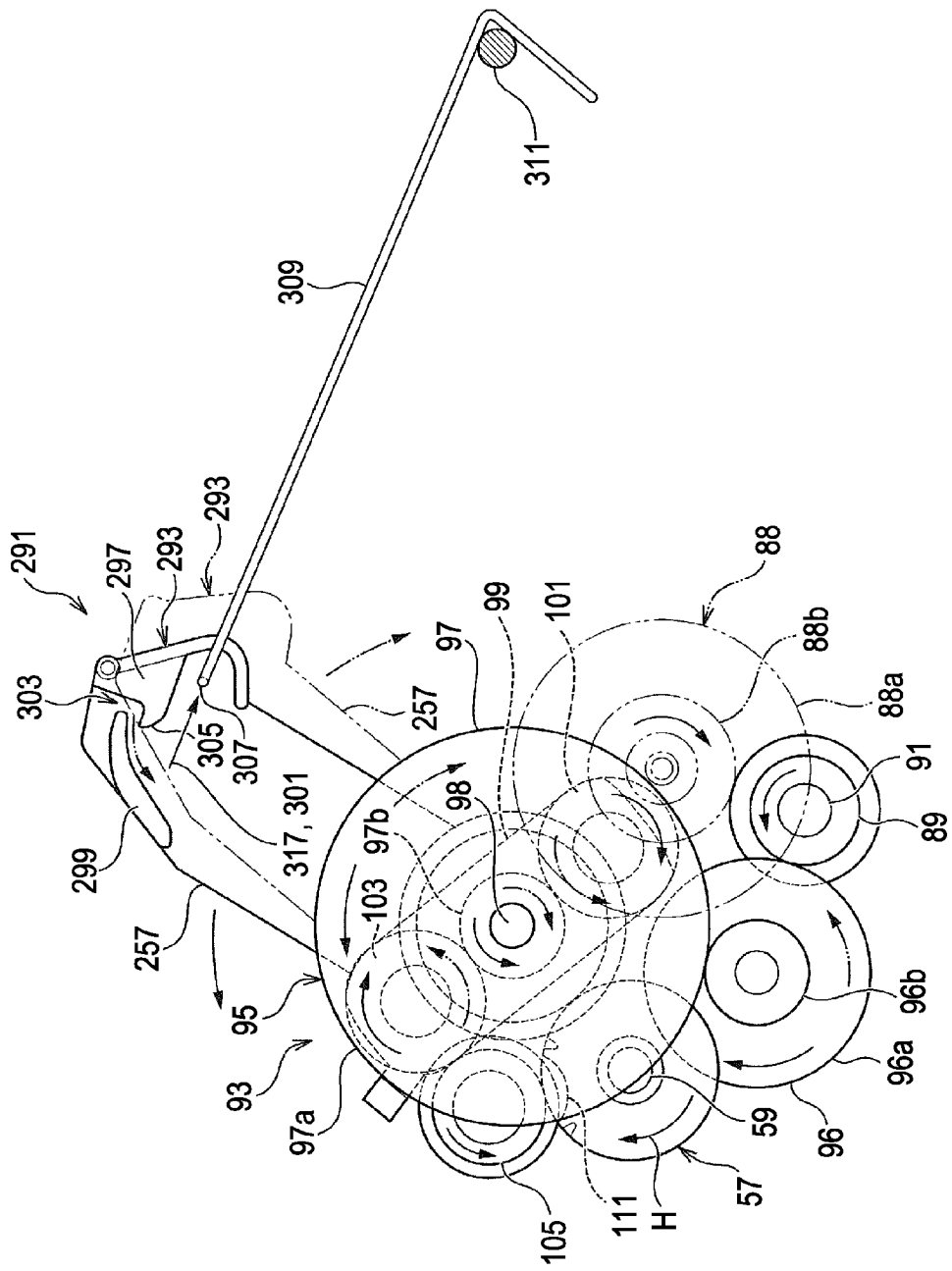
FIG. 26 is a side view showing the power-transmission blocking mechanism of the sheet transporting device according to the embodiment of the invention when the cam driving gear train is in a restored power transmission state.

When the pinion gear 203 of the driving motor 201 is rotated again in the reverse direction CW in this state, the sun gear 97 of the cam driving planetary-gear mechanism 95 rotates clockwise along a dotted-chain line shown in FIG. 26. As the sun gear 97 rotates, the rocking arm 99 rocks in the same direction.

At this time, the engaging portion 307 moves along a path indicated by a dotted-chain arrow 317 so as to become disengaged from the hook portion 305 and abut on the inner wall surface of the second engagement projection 299 before moving leftward in FIG. 26.

When the pinion gear 203 of the driving motor 201 is rotated again in the forward direction CCW in this state, since the rocking of the rocking arm 99 is not restricted by the engagement between the engaging portion 307 and the hook portion 305, the rocking arm 99 rocks freely counterclockwise along a solid line shown in FIG. 26. Thus, the second planetary gear 103 meshes with the intermediate gear 105 so that power is transmitted to the cam driving gear 57 again, thereby rotating the cam driving gear 57 again in the driving direction H.

At this time, the engaging portion 307 moves along a path indicated by a solid arrow 317 so as to shift to the original state in FIG. 23 in which the rocking arm 99 is not restricted from rocking.

The rotation of the cam driving gear 57 in the driving direction H causes the discharge roller 13 to start moving from the release position shown in FIG. 27 to the nip position shown in FIG. 28. When the cam driving gear 57 makes a full rotation and the intermediate gear 105 is made to face the home-position depression 111 provided in the partially-toothed portion 109, the nip-release switching mechanism 55 completes one cycle.

Accordingly, in this invention, the first-face transportation and the second-face transportation that can handle sheets P of various lengths in the transporting direction can be continuously and smoothly performed by switching the rotating direction of the pinion gear 203 of the driving motor 201 between the forward direction CCW and the reverse direction CW at an appropriate timing.

Second Embodiment

A second embodiment of the invention will now be described with reference to FIG. 29.

For example, in the case of the first embodiment, trigger operation for reactivating the cam driving gear 57 from a stopped state is necessary after the image processor 35 starts to read image information. The trigger operation is performed by switching the rotating direction of the driving motor 201 from the forward direction CCW to the reverse direction CW. Therefore, when performing the trigger operation, a non power transmission state in which the first planetary gear 215 to the second planetary gear 217 of the transport planetary-gear mechanism 207 move away from the transport-roller driving gear 75 to the intermediate gear 219 occurs.

Accordingly, when the rotating direction of the driving motor 201 is switched back to the forward direction CCW after the trigger operation, the number of steps of the driving motor 201 detected by the rotary encoder or the like sometimes does not match the actual transported amount of the sheet P, resulting in the occurrence of variations. Therefore, the accuracy of reading the image information by the image processor 35 can be undesirably reduced.

Figure 29:
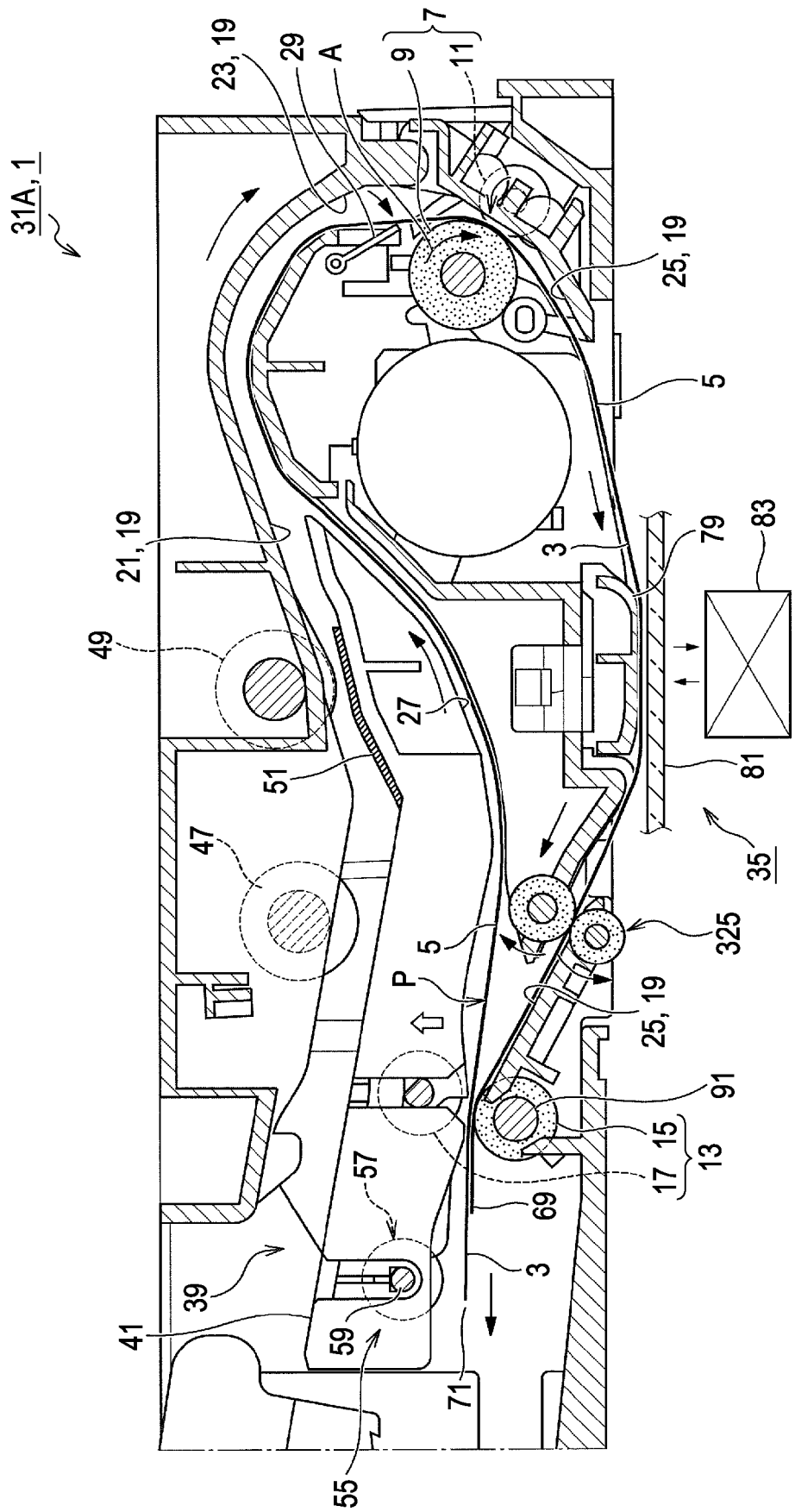
FIG. 29 is a cross-sectional view showing an internal structure of a sheet transporting device according to a second embodiment of the invention at a midpoint of second-face transportation.

In light of this, a sheet transporting device 31A according to the second embodiment shown in FIG. 29 may be provided with an intermediate roller 325 that applies a transporting force to the sheet P and that is disposed at an intermediate point of the transport path 19 located downstream from the transport roller 7 and in front of the discharge roller 13 (i.e., a position downstream of the image processor 35). When such an intermediate roller 325 is provided, the aforementioned trigger operation for reactivating the cam driving gear 57 may be performed after the image processor 35 reads image information, whereby the accuracy required for reading the image information in the image processor 35 can be ensured.

The operation performed in the sheet transporting device 31A shown in FIG. 29 is based on a basic flow shown in FIG. 30. Specifically, after the reading of image information is completed in step S8, the engaging portion 307 and the engaged portion 293 are disengaged from each other so as to unlock the discharge roller 13 locked in the release position.

On the other hand, in the case of the first embodiment, the switching of the rotating direction of the driving motor 201 from the reverse direction CW to the forward direction CCW for performing the aforementioned trigger operation is performed while the image processor 35 reads image information (before the trailing end 71 of the sheet P exits the nip point of the transport roller 7), as mentioned above.

Third Embodiment

Figure 31:
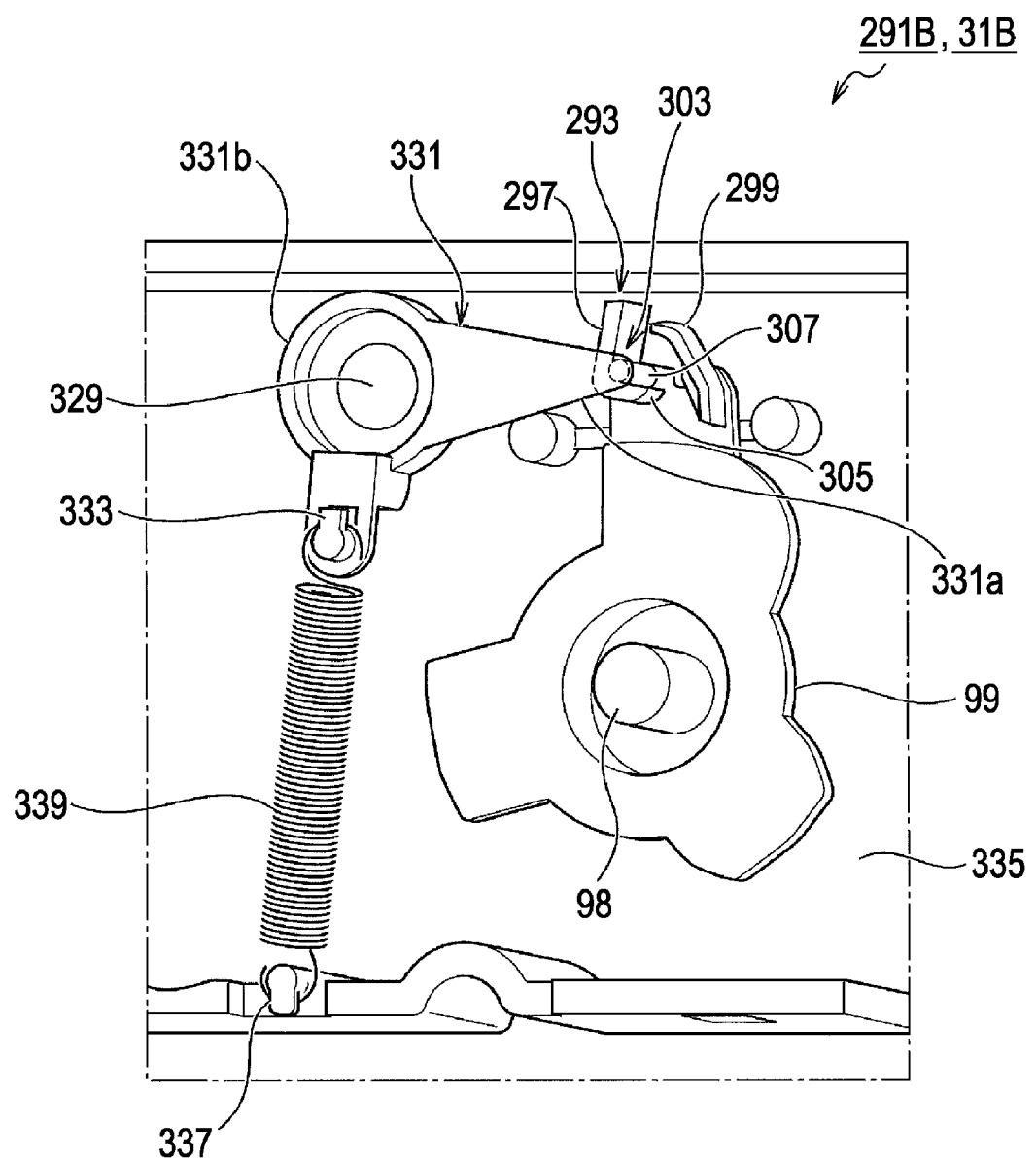
FIG. 31 is a perspective view showing a nip-release switching mechanism of a sheet transporting device according to a third embodiment of the invention.

A third embodiment of the invention will now be described with reference to FIG. 31.

As an alternative to the first embodiment in which the engaging portion 307 is a rod-like member formed integrally with the elastic support rod 309, the engaging portion 307 and a member that applies a bias force to the engaging portion 307 may be formed as separate components. Specifically, a power-transmission blocking mechanism 291B shown in FIG. 31 may be formed by providing the engaging portion 307 at a terminal end 331a of a rocking lever 331 that rocks about a rocking shaft 329, providing a latching hook 333 at a base end 331b of the rocking lever 331, providing a latching hook 337 in a support frame 335 of a sheet transporting device 31B, and providing a bias member 339 formed of, for example, an extension coil spring between the two latching hooks 333 and 337.

The power-transmission blocking mechanism 291B having such a configuration can exhibit the same effects and the same advantages as those of the power-transmission blocking mechanism 291 in the above-described embodiments, and the engaging portion 307 is capable of moving around the engaged portion 293.

Fourth Embodiment

A fourth embodiment of the invention will now be described with reference to FIGS. 32A to 32C.

Figure 32A:
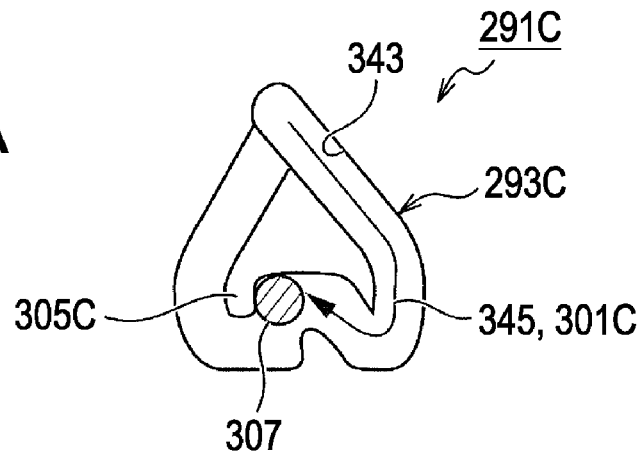
FIGS. 32A to 32C are side views showing a nip-release switching mechanism of a sheet transporting device according to a fourth embodiment of the invention.
Figure 32B:
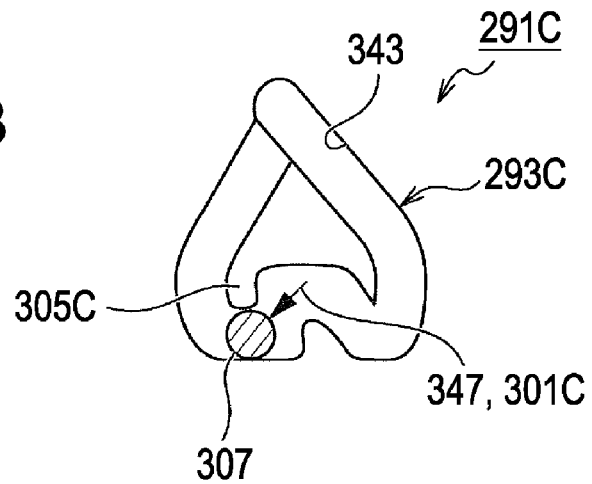
Figure 32C:
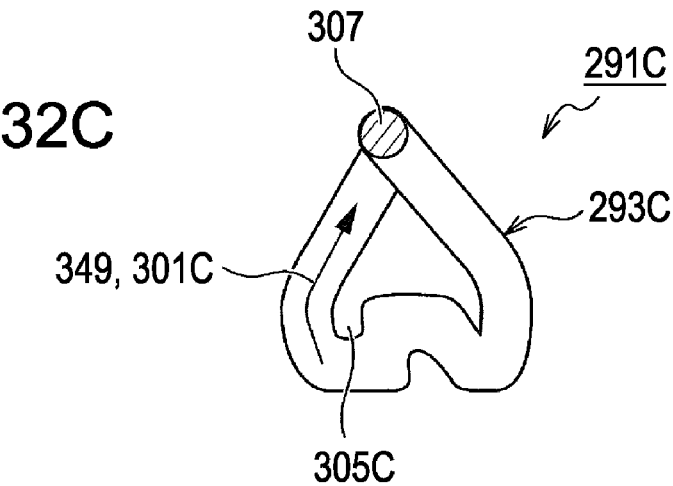

As an alternative to the above embodiments in which the movement path of the engaging portion 307 is formed around the engaged portion 293, the movement path may be a movement path 301C formed in an engaged portion 293C, as in a power-transmission blocking mechanism 291C shown in FIGS. 32A to 32C.

Specifically, as shown in FIGS. 32A to 32C, the engaged portion 293C can be formed by, for example, a heart-shaped cam groove 343, such that the engaging portion 307 can move along the engaged portion 293C in the order shown in FIGS. 32A to 32C.

In the case of the power-transmission blocking mechanism 291C shown in FIGS. 32A to 32C, a hook portion 305C is provided at the bottom of the cam groove 343. Specifically, FIG. 32A illustrates a state where the engaging portion 307 is positioned at the cam-drive stop position at which the discharge roller 13 is locked in the release position. FIG. 32B illustrates a state where the discharge roller 13 is unlocked from the release position by disengaging the engaging portion 307 and the hook portion 305C from each other. FIG. 32C illustrates a state where the cam driving gear 57 is returning to the home position as a result of the discharge roller 13 shifting from the release position to the nip position. The movement paths of the engaging portion 307 in the respective states are denoted by arrows 345, 347, and 349 in FIGS. 32A, 32B, and 32C, respectively.

The power-transmission blocking mechanism 291C having such a configuration can exhibit the same effects and the same advantages as those of the power-transmission blocking mechanism 291 in the above-described embodiments.

Although the sheet transporting device 31 and the image processing apparatus 1 according to the invention basically have the above-described configurations, modifications and omissions of components are permissible without departing from the scope of the invention.

Although not shown in the drawings, a mechanism used in the power-transmission blocking mechanism 291 that allows a selection between a dual-system power transmission state and a single-system non power transmission state can also be used for switching the rotating direction of the feed roller 47 between the feeding direction G and the returning direction D, stopping the rotation of the feed roller 47, and switching the feed roller 47 between a nip position and a release position.

Furthermore, the sheet transporting device 31 according to the invention is not limited to an image reading apparatus, such as a scanner, that continuously reads images from the first face 3 and the second face 5 of the sheet P, but can also be applied to an image reading apparatus, such as a scanner, that reads an image from only one of the first face 3 and the second face 5 of the sheet P.

Furthermore, in addition to these image reading apparatuses, the sheet transporting device 31 with the above-described configuration can also be used in the image processing apparatus 1 that performs various kinds of image processing on both of or one of the first face 3 and the second face 5 of the sheet P. An example of such an image processing apparatus is an image recording apparatus, such as an ink jet printer, that continuously performs recording on both the first face 3 and the second face 5 of the sheet P or performs recording only on one of the first face 3 and the second face 5.

If the sheet transporting device 31 according to the invention is used in an ink jet printer, for example, a recording head may be disposed above the image processor 35, and the sheet supporter may be disposed below the image processor 35.

Furthermore, other examples of the image processor 35 include an image inspection unit that checks whether there is any content recorded on the sheet P or whether or not the content is correct, and a colorimeter that obtains color information from a colorimetric pattern recorded on the sheet P. Alternatively, the image processor 35 may be omitted, and the sheet transporting device 31 can be used alone.

Furthermore, additional nip rollers and additional guide rollers may be added to the transport path 19 and the inversion path 27 so as to handle sheets P with a small length in the transporting direction. The transport object P acting as a target object to be transported is not limited to the sheet P, and may alternatively be a plastic film, such as a polyester film. Moreover, the images on the first face 3 and the second face 5 of the transport object P may be text images, graphic images, or photographic images recorded directly thereon by an image recording apparatus or the like, or may be motifs or patterns expressed on surfaces, as in Japanese paper having motifs or patterns embedded therein.

What is claimed is:

1. A transport-object transporting device comprising:
    a forwardly and reversely rotatable driving motor;
    a transport roller that transports a transport object on a transport path by rotating in a forward direction;
    a discharge roller that discharges the transport object from the transport path by rotating in the forward direction and that sends the transport object to the transport roller via an inversion path by rotating in a reverse direction, the discharge roller capable of being set in a nip position and a release position;
    a nip-release switching mechanism that switches the discharge roller between the nip position and the release position in accordance with a rotational position of a cam driving gear;
    a cam driving gear train that transmits rotation of the driving motor to the cam driving gear, the cam driving gear train having a first planetary gear that transmits power to the cam driving gear by rotating a rocking arm in a predetermined direction when the driving motor rotates in a first direction, and a second planetary gear that transmits power to the cam driving gear via an intermediate gear by rotating the rocking arm in a direction opposite the predetermined direction when the driving motor rotates in a second direction; and
    a power-transmission blocking mechanism that blocks the transmission of power at an intermediate point of the cam driving gear train so as to maintain the discharge roller in the release position,
    wherein the power-transmission blocking mechanism includes
    an engaged portion provided in the rocking arm, and
    an engaging portion whose engagement position thereof relative to the engaged portion is changeable by changing a rocking direction of the rocking arm,
    wherein when the engaging portion is set at a predetermined engagement position relative to the engaged portion, the first planetary gear and the second planetary gear are both kept away from the cam driving gear,
    wherein the power-transmission blocking mechanism is configured to adjust a period of time in which the discharge roller is maintained in the release position to accommodate various lengths of the transport object
    wherein the engaging portion is moved in a certain direction around the engaged portion along a movement path by changing the rocking direction of the rocking arm, the movement path being formed around the engaged portion or in the engaged portion,
    wherein the engaged portion includes a first engagement projection and a second engagement projection that are provided in an extension segment extending from the rocking arm, and
    wherein a guide path that guides the engaging portion to the predetermined engagement position and a hook portion that engages with the engaging portion having reached the predetermined engagement position so as to stop the rocking arm from rocking are provided between the first engagement projection and the second engagement projection.

2. The transport-object transporting device according to claim 1, wherein an intermediate roller that applies a transporting force to the transport object is disposed at a position in the transport path located downstream from the transport roller and in front of the discharge roller.

3. The transport-object transporting device according to claim 1, wherein the engaging portion is movable in accordance with a change in a rocking position of the rocking arm and receives a bias force that tries to set the engaging portion at a predetermined neutral position.

4. The transport-object transporting device according to claim 3, further comprising:
    a feed roller that rotates in the forward direction so as to feed the transport object set on a feed tray;
    a transport-roller driving gear train having a transport planetary-gear mechanism that transmits the rotation of the driving motor to the transport roller;
    a discharge-roller driving gear train having a discharge planetary-gear mechanism that transmits the rotation of the driving motor to the discharge roller; and
    a feed-roller driving gear train that transmits the rotation of the driving motor to the feed roller via the discharge planetary-gear mechanism,
    wherein an arm locking mechanism is provided at a position downstream of the transport roller, the arm locking mechanism locking the movement of the rocking arm of the transport planetary-gear mechanism and unlocking the rocking arm in response to passing of the transport object.

5. An image processing apparatus comprising:
an image processor provided at a position between a transport roller and a discharge roller in a transport path and configured to continuously perform image processing on opposite faces of a transport object transported by the transport roller; and
a transport-object transporting device that switches a transporting direction of the transport object after the image processing is performed on a first face of the transport object so as to make the transport object enter an inversion path where the transport object is subsequently turned over so that a second face opposite the first face of the transport object faces the image processor,
wherein the transport-object transporting device is the transport-object transporting device according to claim 1.

* * * * *